US010568277B2

(12) United States Patent
Stover et al.

(10) Patent No.: US 10,568,277 B2
(45) Date of Patent: Feb. 25, 2020

(54) PLANT EDGING

(71) Applicant: Kent Stover, Inver Grove Heights, MN (US)

(72) Inventors: Kent Stover, Inver Grove Heights, MN (US); Louis F. Polk, III, Excelsior, MN (US); Louis F. Polk, IV, Excelsior, MN (US)

(73) Assignee: Kent Stover, Inver Grove Heights, MN (US)

( * ) Notice: Subject to any disclaimer, the term of this patent is extended or adjusted under 35 U.S.C. 154(b) by 242 days.

(21) Appl. No.: 15/918,320

(22) Filed: Mar. 12, 2018

(65) Prior Publication Data

US 2018/0206418 A1    Jul. 26, 2018

Related U.S. Application Data

(63) Continuation-in-part of application No. 15/629,972, filed on Jun. 22, 2017, which is a continuation-in-part of application No. 15/335,755, filed on Oct. 27, 2016, now abandoned.

(60) Provisional application No. 62/367,375, filed on Jul. 27, 2016.

(51) Int. Cl.
*A01G 9/20*  (2006.01)
*A01G 9/28*  (2018.01)
*A01G 25/02*  (2006.01)
*A01G 13/02*  (2006.01)

(52) U.S. Cl.
CPC ............ *A01G 9/28* (2018.02); *A01G 13/0237* (2013.01); *A01G 25/02* (2013.01); *A01G 13/0268* (2013.01)

(58) Field of Classification Search
CPC ...... A01G 9/28; A01G 13/0212; A01G 13/02; A01G 13/0206; A01G 13/0243; A01G 13/04; A01G 13/043
See application file for complete search history.

(56) References Cited

U.S. PATENT DOCUMENTS

| | | | |
|---|---|---|---|
| 313,424 A * | 3/1885 | Hughes | A01G 13/0281 47/32 |
| 2,978,837 A * | 4/1961 | Neale | A01G 13/0281 47/32 |
| 3,005,287 A | 10/1961 | Dudley | |
| 3,520,082 A | 7/1970 | Smith | |
| 3,676,952 A | 7/1972 | Watts | |
| 3,826,040 A | 7/1974 | Roberts et al. | |
| 4,268,992 A * | 5/1981 | Scharf, Sr. | A01G 13/0243 47/21.1 |
| 4,336,666 A | 6/1982 | Caso | |
| 4,367,822 A | 1/1983 | Pasternack et al. | |

(Continued)

FOREIGN PATENT DOCUMENTS

WO        9834469        8/1998

*Primary Examiner* — Monica L Williams
(74) *Attorney, Agent, or Firm* — Haugen Law Firm PLLP

(57) ABSTRACT

A plant edging is disclosed herein that has an inner side and an outer side and includes a sidewall having a top end and a bottom end with the bottom end configured to engage soil, a head connected to the top end of the sidewall, and a rib connected to and extending away from the outer side near the bottom end of the sidewall. The plant edging is arranged to substantially seal an opening in a landscaping barrier film, and to define a partial enclosure that inhibits ingrowth of invasive weeds.

13 Claims, 21 Drawing Sheets

(56) References Cited

U.S. PATENT DOCUMENTS

| | | | |
|---|---|---|---|
| 4,700,507 A * | 10/1987 | Allen | A01G 13/0243 47/32.4 |
| 4,761,923 A | 8/1988 | Reum et al. | |
| 4,858,378 A * | 8/1989 | Helmy | A01G 13/0281 47/33 |
| 4,934,093 A | 6/1990 | Yanna | |
| RE33,550 E | 3/1991 | Jones | |
| 5,048,229 A * | 9/1991 | Campbell | A01G 13/0237 47/32.4 |
| 5,073,061 A * | 12/1991 | Jones | E01C 11/221 404/7 |
| 5,323,557 A * | 6/1994 | Sonntag | E01F 15/0469 47/32 |
| 5,465,526 A | 11/1995 | Langley | |
| 5,577,343 A | 11/1996 | Flasch, Jr. | |
| 5,867,953 A * | 2/1999 | Amundsen | E02D 27/00 52/146 |
| 5,930,947 A | 8/1999 | Eckhoff | |
| 5,956,892 A | 9/1999 | Kownacki et al. | |
| D440,833 S | 4/2001 | Tanner | |
| 6,243,984 B1 * | 6/2001 | Wright | A01G 9/28 47/32.7 |
| 6,767,159 B2 | 7/2004 | Jones | |
| 6,976,334 B1 | 12/2005 | Bowditch | |
| 7,707,768 B2 | 5/2010 | Helmy | |
| 7,908,792 B2 | 3/2011 | Heighton | |
| 7,967,524 B2 | 6/2011 | Jones | |
| 8,365,465 B2 * | 2/2013 | Ogilvie | A01G 13/0256 47/31.1 |
| 8,826,588 B1 | 9/2014 | MacKichan et al. | |
| 9,115,507 B2 | 8/2015 | Wyrostek | |
| 9,345,202 B2 | 5/2016 | Thompson | |
| 9,872,442 B2 | 1/2018 | Shaffer | |
| 2009/0223121 A1 | 9/2009 | Jones | |
| 2013/0174482 A1 | 7/2013 | Galdi | |
| 2016/0278305 A1 * | 9/2016 | Reed, II | A01G 13/04 |
| 2018/0359958 A1 * | 12/2018 | Schroeder | A01G 9/16 |

* cited by examiner

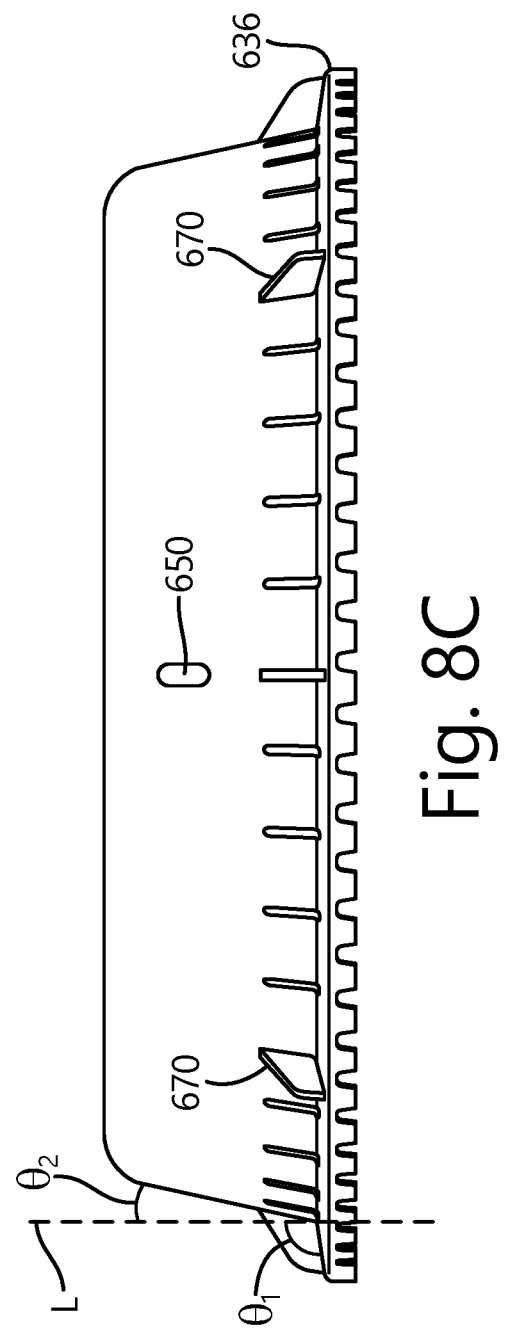

PLANT EDGING

CROSS-REFERENCE TO RELATED APPLICATION

This application is a continuation-in-part of U.S. patent application Ser. No. 15/629,672, filed on Jun. 22, 2017 and entitled "PLANT EDGING", which itself is a continuation-in-part of U.S. patent application Ser. No. 15/335,755, filed on Oct. 27, 2016 and entitled "PLANT EDGING", which itself claims priority to U.S. provisional patent application Ser. No. 62/367,375, filed on Jul. 27, 2017 and entitled "PLANT EDGING", the contents of such applications being incorporated herein in their entirety.

BACKGROUND

The present disclosure relates to landscaping and maintenance of plants and, in particular, to an edging surrounding an area for plants.

In landscaping and gardening, it has been conventional practice to surround plants, such as trees, flowers, and bushes, to provide protection and an aesthetic delineation between grass or other landscaping materials, such as stone, wood chips, sand, etc. The protection, which can come in the form of a plastic or brick edging, can retain water to conserve water and prevent runoff. Further, the edging may be helpful in controlling weed growth around the plant. The edging can provide delineation between grass, which will need to be cut by a lawn mower, and the plant that needs to be protected from damage due to a lawn mower.

Currently implemented edgings are two-dimensional barriers that extend straight into the ground and are installed in the ground with soil on an inner, plant side and landscaping materials on an outer side. The barriers can be pushed into the ground without the removal or addition of any materials around the barriers, or the barriers can be set on top of a surface with soil and other materials backfilled around the barriers. With the barriers being two dimensional, the barriers can move upwards (out of the ground) over time or be easily pulled upwards, causing time and expense in reinstalling the barrier. Often times, when landscaping materials like stone, wood chips, or sand are used to surround the outer side of the barriers, a fabric is first placed on the ground with the landscaping material placed on top of the fabric. With the two-dimensional barrier and the fabric intersecting at or close to a right angle, creating a tight seal that prevents the landscaping material from slipping through the interface between the barrier and the fabric is difficult because the fabric tends to fold back over on itself. Thus, there is need for an edging that cannot be easily pulled upwards out of the ground and that is able to provide a seal between the edging and the fabric.

SUMMARY

A plant edging is disclosed herein that has an inner side and an outer side and includes a sidewall having a top end and a bottom end with the bottom end configured to engage soil, a head connected to the top end of the sidewall, and a rib connected to and extending away from the outer side near the bottom end of the sidewall to form a substantially V-shape with the bottom end of the sidewall. The rib has a distal end configured to engage soil.

A planter ring is disclosed herein that includes a wall that is annular in shape and has a radially inner side, a radially outer side, a top end, and a bottom end. The planter ring also includes a branch that is annular in shape and connected to the radially outer side of the wall near the bottom end with the branch extending to a point on a plane formed by a bottom of the planter ring.

A plant edging is disclosed herein that includes an annular frustoconical wall having an inner surface and a generally opposed outer surface, and an upper end and a lower end, with the upper end having a first diameter that is smaller than a second diameter of the lower end. The plant edging further includes a head connected to the upper end of the wall, wherein the head extends curvilinearly and radially inwardly from the upper end of the wall. A rib is connected to and extends outwardly from the outer surface near the bottom end of the wall, and the wall includes an opening that is configured to receive irrigation piping therethrough. The plant edging includes a plurality of elongate slots forming passages through the wall.

A method for inhibiting weed growth in proximity to a plant is disclosed herein, wherein the method includes providing a plant edging having a sloped wall defining a partial enclosure with an inner surface and a generally opposed outer surface, and the sloped wall having an upper end surrounding an upper opening to the partial enclosure, and a lower end surrounding a lower opening to the partial enclosure, with the sloped wall sloping inwardly from the lower end toward the upper end. The plant edging includes a head connected to an extending inwardly from the upper end of the wall, and a rib connected to and extending outwardly from and about the outer surface, and terminating in an outer edge, wherein the rib has an upper surface and a lower surface. The method includes placing a barrier film in proximity to a ground surface, and inserting the rib of the plant edging through an opening in the barrier film so that the barrier film is juxtaposed with the upper surface of the rib about the outer surface of the sloped wall, and so that the plant is capable of extending through the upper opening of the partial enclosure.

The present summary is provided only by way of example and not limitation. Other aspects of the present disclosure will be appreciated in view of the entirety of the present disclosure, including the entire text, claims, and accompanying figures.

BRIEF DESCRIPTION OF THE DRAWINGS

FIG. 8C is a side elevation view of the plant edging of FIG. 8A.

Figure 1A:
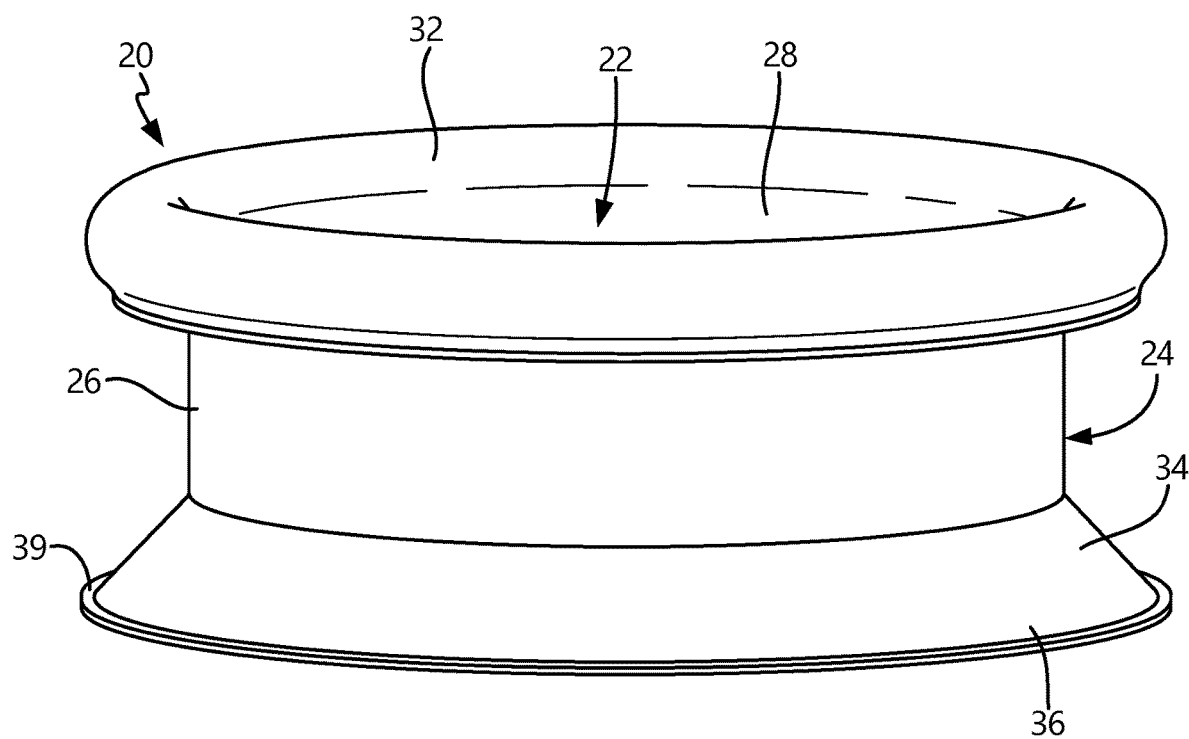
FIG. 1A is a perspective view of a plant edging.

While the above-identified figures set forth embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

A plant edging, which can also be configured in a continuous ring to form a planter ring, is disclosed herein having a sidewall, a head at a top end of the sidewall, and a rib connected to and extending away from an outer side of the sidewall. The plant edging provides protection to plants on an inner side of the plant edging and delineation from grass or other materials on an outer side of the plant edging. The rib, also called a branch, can form a substantially V-shape with a bottom end of the sidewall. The rib is configured to engage soil or a landscaping material, such as stone, gravel, wood chips, or sand, to prevent the plant edging from shifting or being pulled out of the ground in which the plant edging is installed. The rib is also configured to engage a fabric liner that is commonly utilized in landscaping, with the rib providing an angled surface to create a seal between the plant edging and fabric that prevents soil or the landscaping material from seeping through an interface between the two.

The prevention of soil seepage is a key component in preventing weed growth. Typical plant edging products fail to properly establish a barrier to soil movement, and particularly soil movement over the top of a weed barrier fabric. Once soil has overspread the weed barrier fabric, weeds can propagate on top of the fabric. The present plant edging addresses this problem by providing a sidewall and optionally a rib that are configured to engage with a weed barrier film in a manner that forms a seal between the plant edging and the weed barrier film. Soil that is used for the plant on a first side of the present plant edging is therefore prevented from seeping between the plant edging and the weed barrier film engaged to the second side of the plant edging.

Figure 1B:
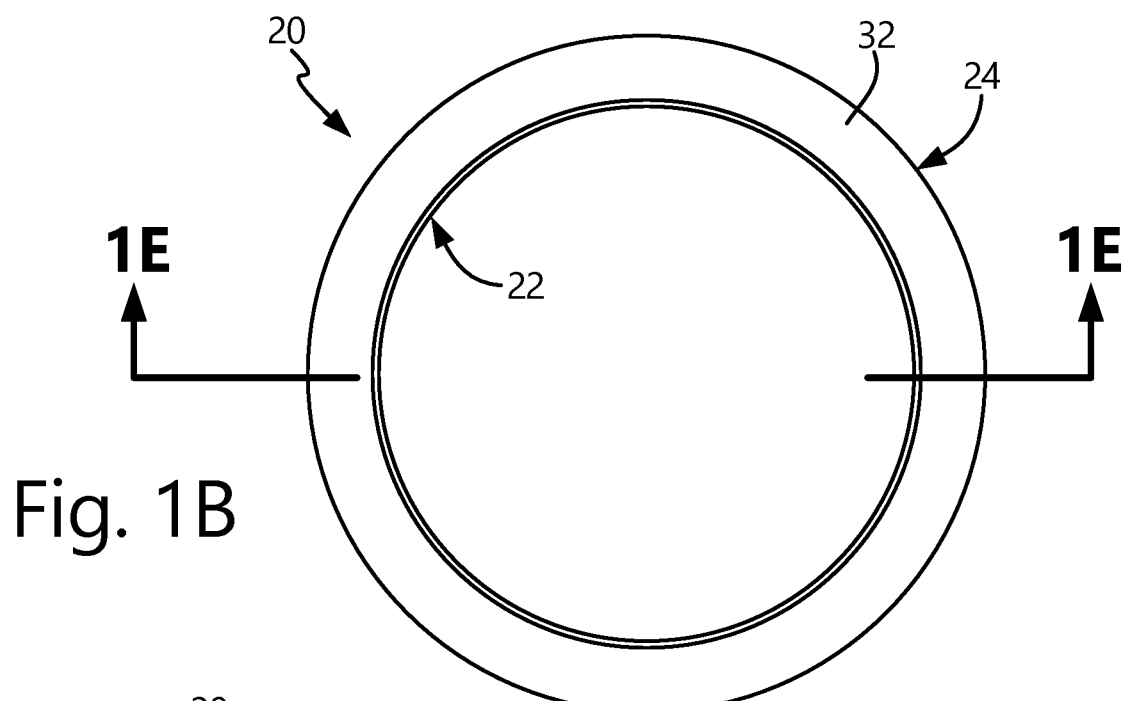
FIG. 1B is a top plan view of the plant edging in FIG. 1A.
Figure 1C:
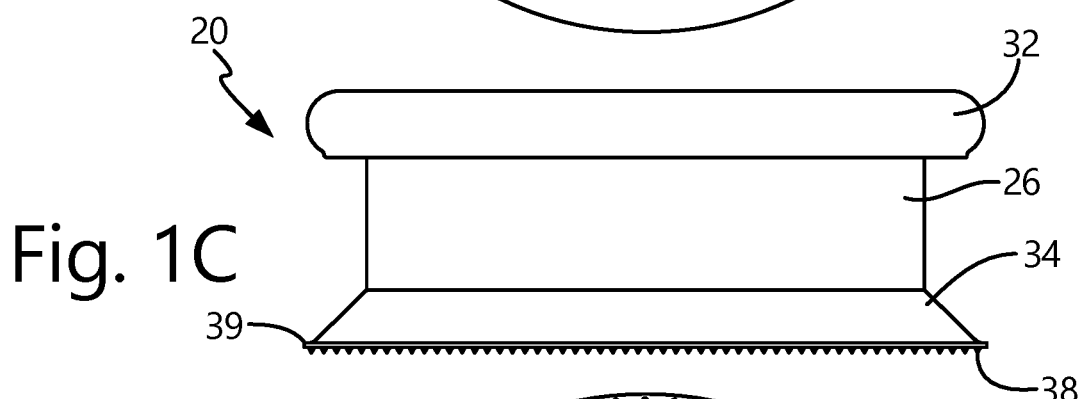
FIG. 1C is an elevation view of the plant edging in FIG. 1A.
Figure 1D:
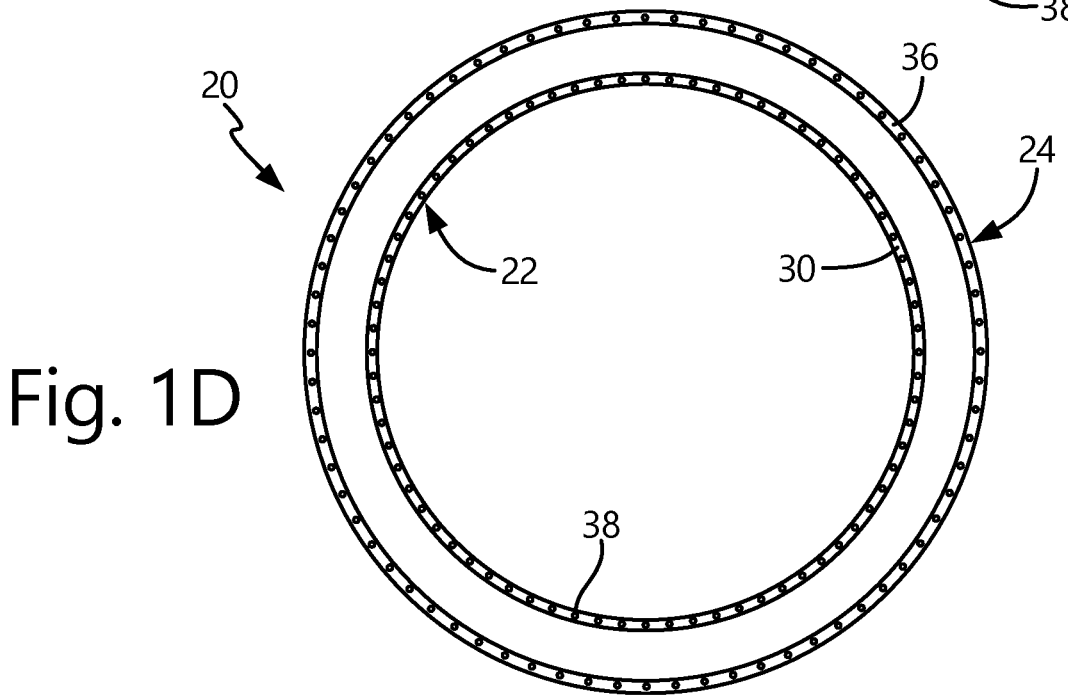
FIG. 1D is a bottom plan view of the plant edging in FIG. 1A.
Figure 1E:
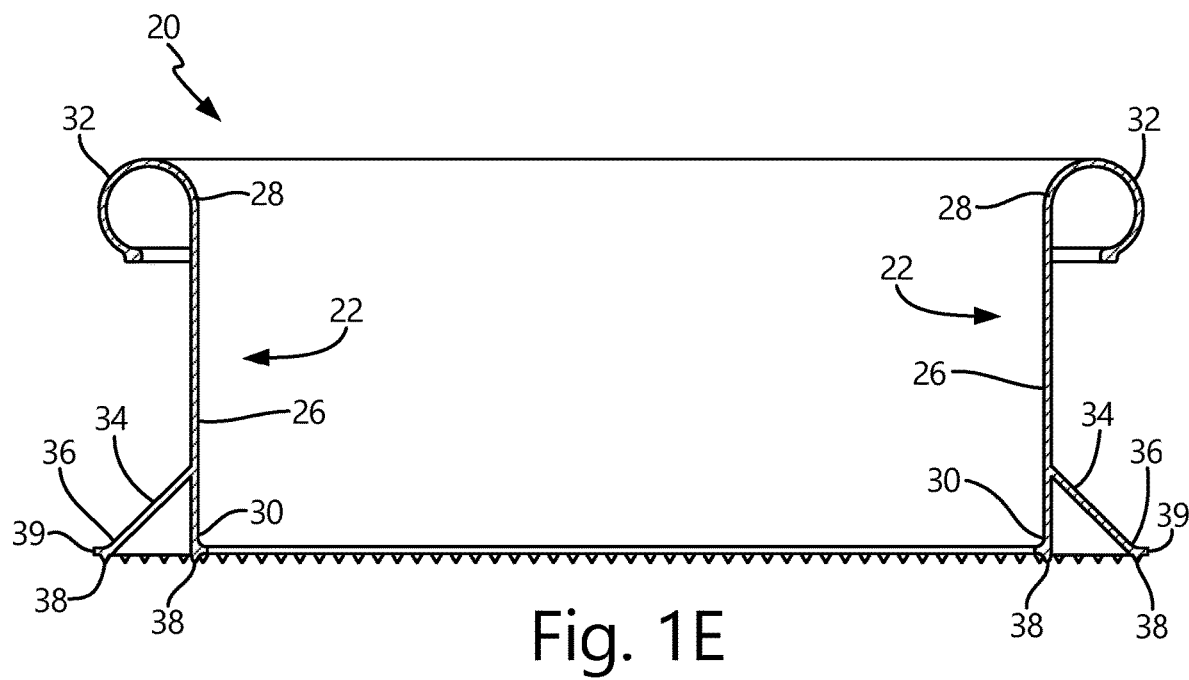
FIG. 1E is a cross-sectional elevation view of the plant edging in FIG. 1A.

The rib can extend at any angle and can be any length, including an angle that is as much as or more than sixty degrees from the sidewall and a length in which a distal end of the rib extends further downward than the bottom of the sidewall. Further, the rib and the bottom of the sidewall (the V-shape) can form a lift lip that connects the distal end of the rib and the bottom end of the sidewall to form a triangular member at the bottom of the pant edging for more support and strength. Teeth can be located on the bottom of the sidewall and on the distal end of the rib to aid in engagement of the plant edging with the soil or landscaping material. After reviewing the description and corresponding figures below, these and other benefits will be realized. FIG. 1A is a perspective view of a plant edging, FIG. 1B is a top plan view of the plant edging in FIG. 1A, FIG. 1C is an elevation view of the plant edging in FIG. 1A, FIG. 1D is a bottom plan view of the plant edging in FIG. 1A, and FIG. 1E is a cross-sectional elevation view of the plant edging in FIG. 1A. Plant edging 20 (which, when in an annular shape, can also be referred to as a planter ring) includes radially inner side 22, radially outer side 24, sidewall 26 with top end 28 and bottom end 30, head 32, rib 34, and teeth 38. Rib 34 includes distal end 36 and rib flange 39.

Plant edging 20 divides soil or another material adjacent to radially inner side 22 from a landscaping material adjacent to radially outer side 24. Plants, such as flowers, bushes, trees, or vegetables, are planted and grow in the soil adjacent to radially inner side 22, with plant edging 20 providing protection to the plants and ensuring the soil remains separate from the landscaping material. Plant edging 20 can be one continuous and monolithic piece that is molded or otherwise formed concurrently, or plant edging 20 can be a number of pieces fastened together through various means. Plant edging 20 can be constructed from a variety of materials, including metal, plastic, a composite material, a polymer, or another material. Plant edging 20 can be constructed from a flexible and resilient material that is able to bend and be rolled into a bale for storage and/or transportation or able to bend and curve during installation/placement to meet landscaping needs. Further, plant edging 20 can be curved to form a continuous ring (referred to as a planter ring) as shown in FIGS. 1A-1E and 5A-5B. Plant edging 20 can have various heights depending on the depth of the landscaping material and other considerations, including a height that is approximately 12.45 centimeters (4.9 inches). Similarly, plant edging 20 can have any thickness depending on the strength/rigidity needed, the type of material plant edging 20 is constructed from, the type of material on radially inner side 22, and the type of material used for the landscaping material. The height of plant edging 20 can vary along the length of plant edging 20, and the thickness of plant edging 20 can vary along the height of plant edging 20, including a greater thickness at bottom end 30 than a thickness at top end 28.

If a ring such that plant edging is a planter ring (as in FIGS. 1A-1E), plant edging 20 can be configured to be a continuous and unending ring that surrounds and protects a plant or a number of plants, delineates the soil on radially inner side 22 from grass or other materials on radially outer side 24, and provides a surface that a fabric used in landscaping can rest upon to form a seal between rib 34 and the fabric so that the landscaping material cannot seep into an area within plant edging 20. Plant edging 20 can be any size, including a configuration that has a diameter measured between opposite radially inner sides 22 of sidewall 26 that is approximately 20.32 centimeters (8.0 inches) or 45.72 centimeters (18.0 inches). Further, while plant edging 20 is shown in FIGS. 1A-1E as a circular ring, plant edging 20 can have other shapes, such as a triangle, oval, rectangle, pentagon, hexagon, or others. The circular configuration of plant edging 20 may be advantageous when used with one plant or a small number of plants, as individual plants can be surrounded by plant edging 20 without the need for the installer/landscaper to curve or bend plant edging 20 into place surrounding the plant or plants.

Sidewall 26 (also referred to as a wall) is the main structural component of plant edging 20 and extends from top end 28 to bottom end 30. Sidewall 26 provides a barrier to separate soil (and plants) on radially inner side 22 from the landscaping material on radially outer side 24. While sidewall 26 is shown in FIGS. 1A-1E as a straight extension between top end 28 and bottom end 30, sidewall 26 can be slanted/angled, wavy, zig-zagged, or another configuration. Further, sidewall 26 can extend horizontally (i.e., in a circumferential direction in FIGS. 1A-1E) in a slanted/angled/sloped, wavy, curved, zig-zagged, or another configuration. Sidewall 26 can have flanges or other members that connect to sidewall 26 (such as an inward extending flange at bottom end 30) for increased strength or for other reasons.

Figure 5A:
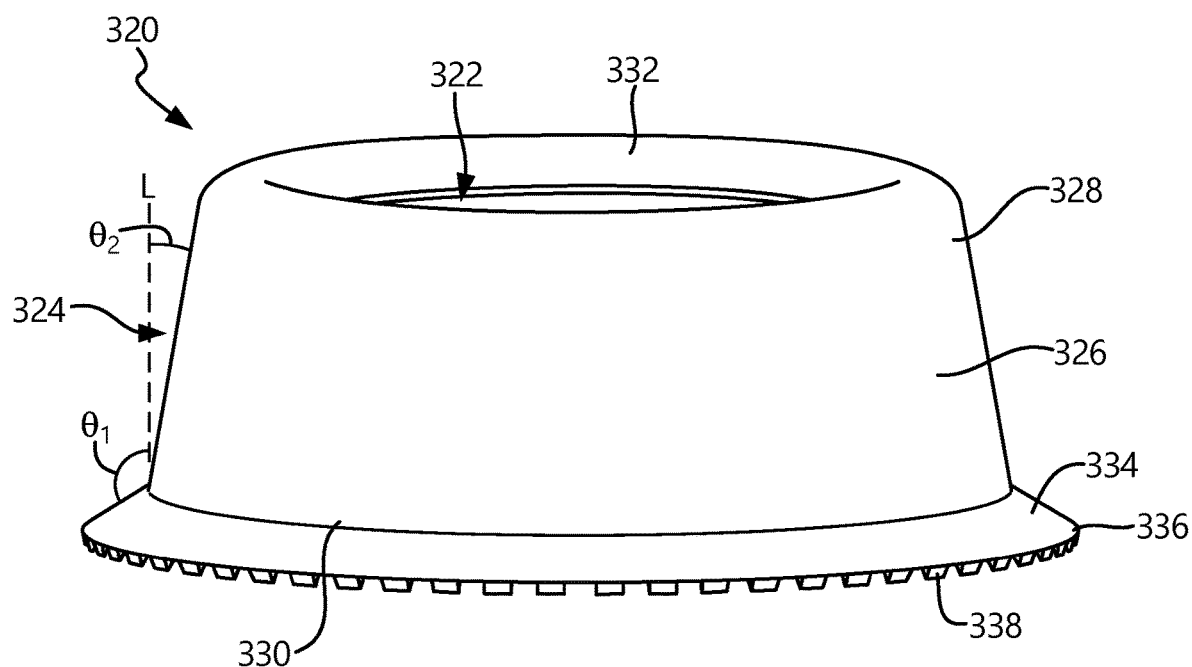
FIG. 5A is a perspective view of another embodiment of a plant edging.
Figure 5B:
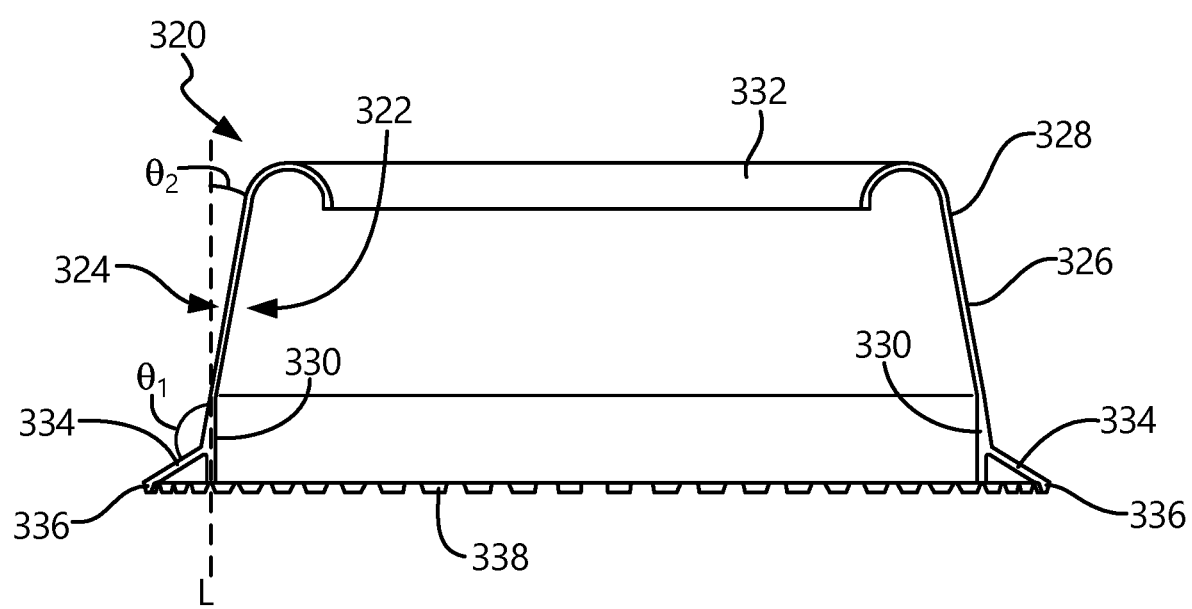
FIG. 5B is a cross-sectional elevation view of the plant edging of FIG. 5A.

Head 32 is connected to top end 28 of sidewall 26. Head 32 can have a variety of configurations, including a solid circular cross-sectional member, a semi-circular cross-sectional member, a shepherds-hook shaped cross-sectional member, a rectangular cross-sectional member, a triangular cross-sectional member, or another configuration. Further, other embodiments of plant edging 20 can include a configuration that does not include a head. Head 32 can extend from radially inner side 22 (as shown in FIGS. 5A and 5B) or from radially outer side 24 (as shown in FIGS. 1A-1E). In FIGS. 1A-1E, head 32 is a shepherds-hook shaped cross-sectional member that extends from radially outer side 24 of top end 28 of sidewall 26 and has a curved cross section in which an end of head 32 curves to a point between a semicircle and a full circle. Further, head 32 includes a flange that extends inward towards radially outer side 24 of sidewall 26 and also extends downwards towards rib 34. Head 32 can have a hollow interior (within the shepherds-hook shaped cross-sectional member) or can be filled such that no void is present within head 32. Head 32 provides strength and rigidity to plant edging 20, and can be configured to be an aesthetically pleasing top to plant edging 20. Because plant edging 20 is mostly buried by soil and the landscaping material, head 32 may be the only component of plant edging 20 that is in view after plant edging 20 has been installed. Thus, it may be desirable for head 32 to be aesthetically pleasing, such as a color, coating, or material that is different than the other components of plant edging 20. Further, as may be desired, the shape and configuration of head 32 can vary along the horizontal length of plant edging 20 (i.e., in the circumferential direction).

Rib 34 (also referred to as a branch) is connected to and extends from radially outer side 24 near bottom end 30 of sidewall 26. Rib 34 and bottom end 30 of sidewall 26 form a substantially V-shape with distal end 36 of rib 34 located at a point on rib 34 that is furthest from sidewall 26. Rib 34 can extend away from sidewall 26 at any angle, including an angle that is between zero and ninety degrees. In the embodiment in FIGS. 1A-1E, rib 34 extends away from sidewall 26 at a forty-five degree angle. Rib 34 can extend straight from sidewall 26 as shown in FIGS. 1A-1E, or can have another configuration, such as waves, curves, or zig-zags. The configuration of rib 34 can vary along the horizontal length of plant edging 20 (i.e., in the circumferential direction). Rib 34 can have a same or a different thickness than the thickness of sidewall 26, and rib 34 can have a varying thickness as rib 34 extends to distal end 36. Rib 34 can have flanges or other members that connect to rib 34 for increased strength or for other reasons, such as radially outward extending rib flange 39 at distal end 36. As shown in FIGS. 1A-1E, rib flange 39 is present on rib 34 that extends from distal end 36 radially outwards towards the landscaping material. Rib flange 39 can provide a surface for teeth 38, which will be described below. Bottom end 30 and distal end 36 of rib 34 can be connected to form a triangular lift lip, which can be a hollow member or a filled member that does not include a void. Such a configuration will be described in greater detail with regards to FIG. 4. With rib 34 being a lift lip, a bottom surface of rib 34 (i.e., the lift lip) can provide a greater area for teeth 38. Further, the triangular lift lip may provide added strength and rigidity to rib 34 and bottom end 30.

Distal end 36 of rib 34 can extend in a downward direction to a point that is on a plane formed by the bottom end 30 of sidewall 26 perpendicular to sidewall 26 (i.e., a plane formed by a bottom of the planter ring). Alternatively, distal end 36 of rib 34 can extend so that distal end 36 is at a point that is further downward from the plane formed by the bottom end 30 of sidewall 26 or is upward from the plane formed by the bottom end 30 of sidewall 26 (i.e., distal end 36 does not extend to the plane).

Teeth 38 are downwardly extending projections on a bottom side of bottom end 30 of sidewall 26 and on a bottom side of distal end 36 of rib 34. Teeth 38 are able to engage soil or a material on which plant edging 20 is located by digging into the material. Teeth 38 can be as long or short as needed depending on the material plant edging 20 is constructed from and on the material on which plant edging 20 is located. Each tooth of teeth 38 can be triangular, semi-circular, rectangular, trapezoidal, or other shape and can extend a distance that is constant among teeth 38 or different from adjacent teeth 38. While teeth 38 are shown in FIGS. 1A-1E as being present on both bottom end 30 of sidewall 26 and distal end 36 of rib 34, teeth 38 can be present on only one, or plant edging 20 can be configured such that teeth 38 are not present. Teeth 38 in FIGS. 1A-1E are conical projections in a downward direction configured to engage soil or another material to better hold plant edging 20 in place. Teeth 38 span the entire circumferential length of bottom end 30 and rib 34 around plant edging 20, but teeth 38 can have other configurations, such as only partially spanning the circumferential length of plant edging 20, being a constant or varied space from adjacent teeth 38, or being present only on one of bottom end 30 and rib 34.

Distal end 36 of rib 34 includes rib flange 39, which is a radially outward extending ledge. Rib flange 39 increases a bottom surface area of distal end 36 to provide a larger area to accommodate teeth 38. Further, rib flange 39 increases a surface area of rib 34 to provide a greater surface on which landscaping material can be installed/filled, making removal of plant edging 20 more difficult after landscaping material is in place. Thus, rib flange 39 aids in preventing plant edging 20 from shifting or being pulled out of the ground because rib flange 39 allows more landscaping material to be filled in on top of rib 34, increasing the weight and downward force the landscaping material exerts on rib 34 and plant edging 20.

Rib 34 is configured to engage a fabric liner and provide a surface for creating a seal between rib 34 and the fabric to prevent soil or landscaping material from seeping into an area below the fabric and an area on radially inner side 22 of plant edging 20. Because rib 34 is angled/slanted, the fabric rests on rib 34 without folding over as the fabric is inclined to do if rib 34 was not present (as will be described with regards to FIGS. 2, 3, and 4). Without rib 34, the fabric is adjacent to bottom end 30 and must make a ninety-degree turn to extend up radially outer side 24 of sidewall 26. With rib 34 present, fabric 42 must only make a forty-five degree turn up rib 34 (or another angle in other embodiments of plant edging 20), providing a more suitable surface for the fabric to prevent the fabric from folding over onto itself and thus allowing a gap for the landscaping material to seep through the interface between plant edging 20 and the landscaping material. Further, after the landscaping material is filled in adjacent to radially outer side 24 so that the landscaping material is above rib 34, plant edging 20 cannot be easily and unintentionally removed because rib 34 is below the landscaping material and held in place by the weight of the landscaping material.

Figure 2:
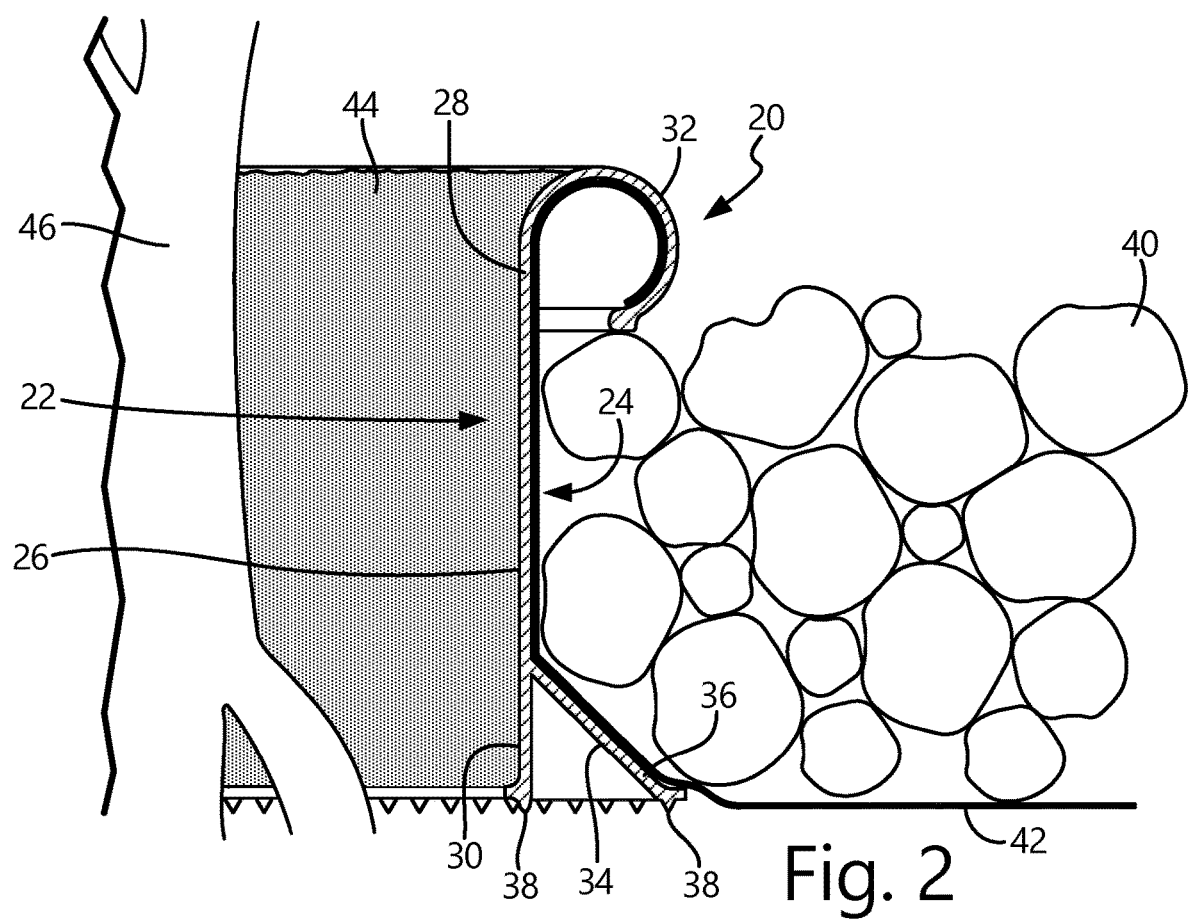
FIG. 2 a cross-sectional elevation view of the plant edging in FIG. 1A installed in a landscaping environment.

FIG. 2 is a cross-sectional elevation view of plant edging 20 in FIG. 1A installed in a landscaping environment. Plant edging 20 includes radially inner side 22, radially outer side 24, sidewall 26 with top end 28 and bottom end 30, head 32, rib 34, and teeth 38. Rib 34 includes distal end 36 and rib flange 39. Also shown in FIG. 2 but not part of plant edging 20 are landscaping material 40, fabric 42, soil 44, and plant 46.

Figure 3:
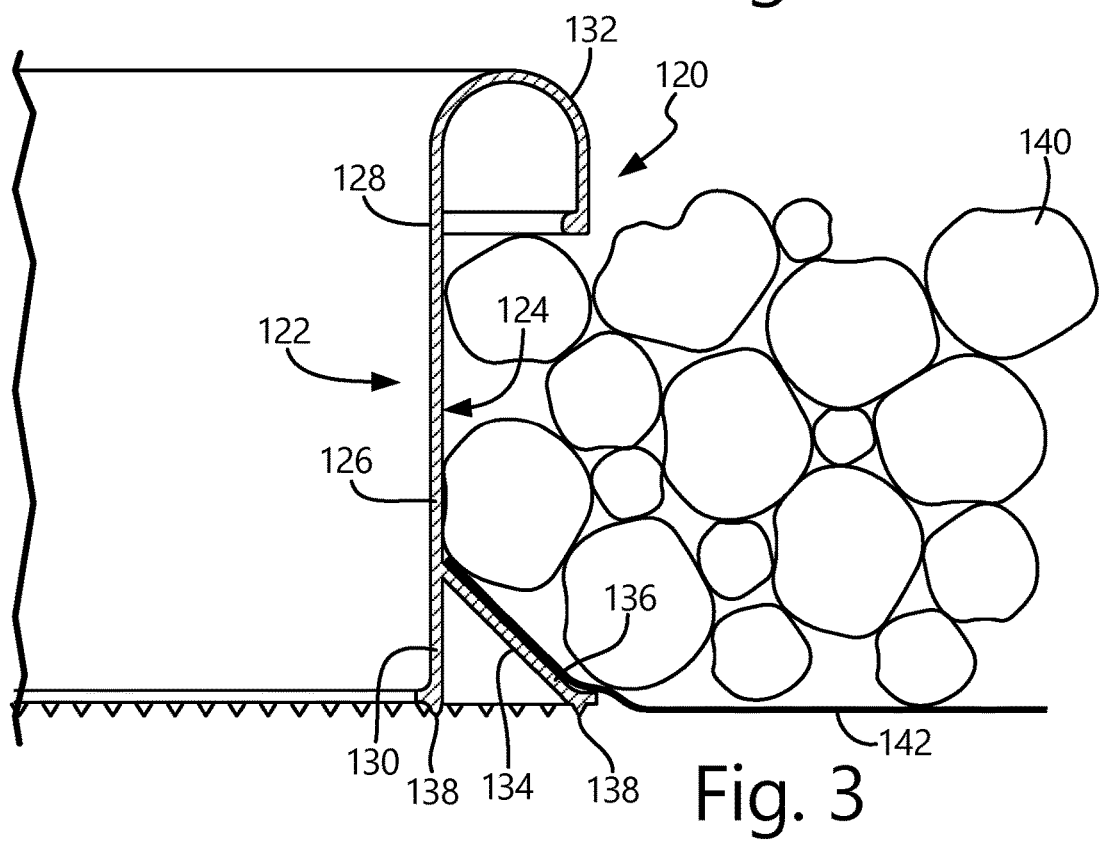
FIG. 3 is a cross-sectional elevation view of one embodiment of a plant edging.
Figure 4:
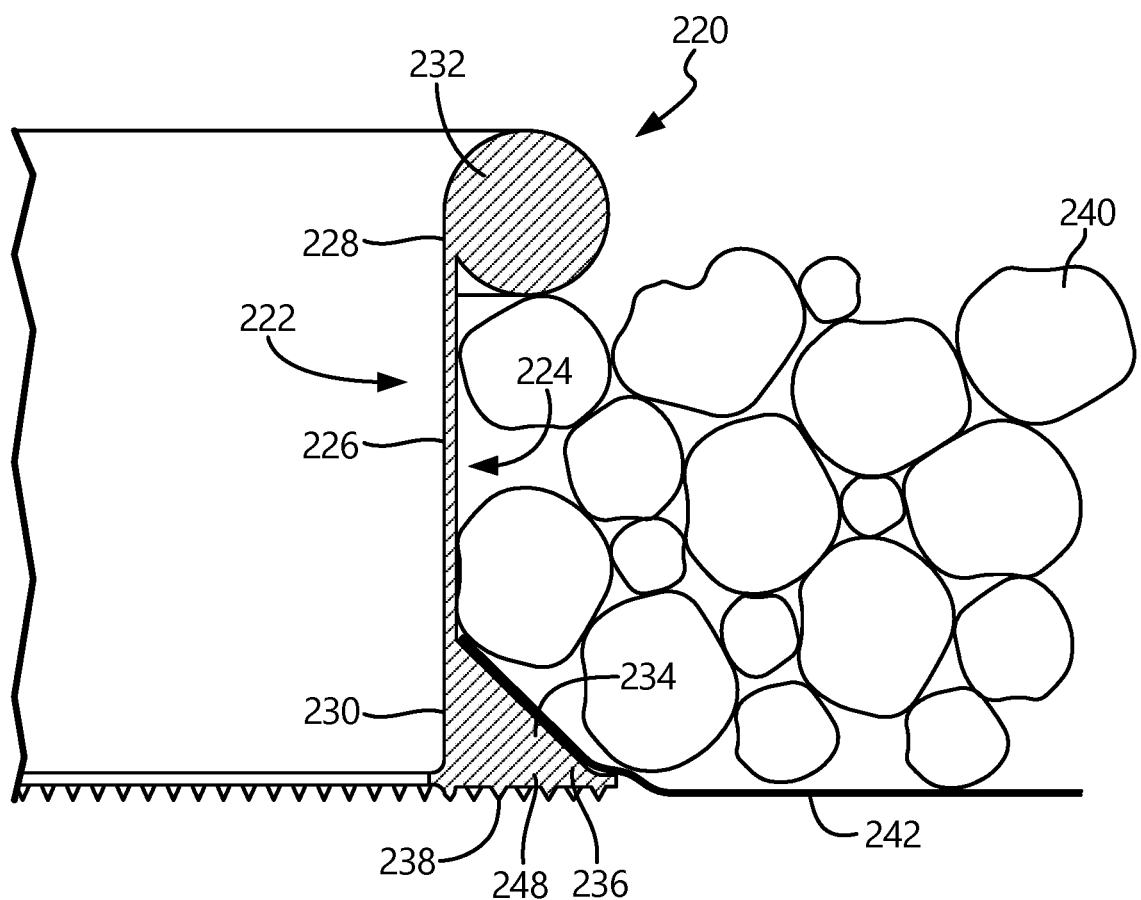
FIG. 4 is a cross-sectional elevation view of another embodiment of a plant edging.

Plant edging 20 in FIG. 2 is shown with landscaping material 40 adjacent to radially outer side 24 and soil 44 adjacent to radially inner side 22. Planted within soil 44 is plant 46, which can be any type of plant, including flowers, bushes, trees, vegetables, or other plants. While the material on radially inner side 22 is designated as soil 44, soil 44 can be other materials. Further, landscaping material 40 can be any type of material, including soil, rock, wood chips, gravel, sand, grass, or other materials. Plant edging 20 can be configured to fit any type and size of plants. Fabric 42 is placed between a surface of the ground and landscaping material 42 to prevent landscaping material 42 from mixing with the material that plant edging 20 and landscaping material 42 is installed upon. As stated above, plant edging 20 is configured to engage fabric 42 and provide a surface for creating a seal between plant edging 20 and fabric 42 to prevent soil 44 or landscaping material 40 from seeping into an area below fabric 42 and an area on radially inner side 22 of plant edging 20. In some embodiments, fabric 42 can be placed on rib 34 (as shown in FIGS. 3 and 4). In FIG. 2, fabric 42 is configured to extend over a top of rib 34, up radially outer side 24 of sidewall 26, and wrap around a void within head 32. Because fabric 42 is wrapped within the void within head 32, fabric 42 is held in place without folding over onto itself and thus provides a seal between fabric 42 and plant edging 20. The configuration of fabric 42 extending into the void within head 32 can be utilized with other embodiments, and plant edging 20 can include other components to hold fabric 42.

FIG. 3 is a cross-sectional elevation view of one embodiment of a plant edging. Similar to plant edging 20, plant edging 120 includes inner side 122, outer side 124, sidewall 126 with top end 128 and bottom end 130, head 132, rib 134 with distal end 136, and teeth 138. Also shown in FIG. 3 but not part of plant edging 120 are landscaping material 140 and fabric 142.

Plant edging 120 is similar in configuration and functionality to plant edging 20, except that head 132 of plant edging 120 is a semi-circular cross-sectional member, and plant edging 120 does not have an annular shape. Also, fabric 142 extends only to a point where rib 134 connects to sidewall 126.

In FIG. 3, head 132 extends from outer side 124 of top end 128 of sidewall 126 and has a semi-circular cross-sectional member with a flat, partially inwardly extending and partially downwardly extending flange. Head 132 extends out from outer side 124 of top end 128 of sidewall 126. Head 132 can have a hollow interior (within the semi-circular cross section) or can be filled such that no void is present within head 32. The configuration of head 132 in FIG. 3 can provide additional strength and rigidity to plant edging 120, and can be an aesthetically pleasing top to plant edging 120 because plant edging 120, when installed, is mostly buried by soil and landscaping material 142. As may be desired, the shape and configuration of head 132 can vary along a horizontal length of plant edging 120 (i.e., into the page in FIG. 3).

FIG. 4 is a cross-sectional elevation view of another embodiment of a plant edging. Similar to plant edging 20 in FIGS. 1A-1E and 2 and plant edging 120 in FIG. 3, plant edging 220 includes inner side 222, outer side 224, sidewall 226 with top end 228 and bottom end 230, head 232, rib 234 with distal end 236, teeth 238, and lift lip 248. Also shown in FIG. 4 but not part of plant edging 220 are landscaping material 240 and fabric 242.

Plant edging 220 is similar in configuration and functionality to plant edging 20 in and plant edging 120, except that head 232 of plant edging 220 has a filled in, circular cross section, and plant edging 220 includes lip lift 248, which forms a filled in triangular member in conjunction with bottom end 230 and rib 234.

Head 232 has a cross section that is circular in shape and extends from outer side 224 of top end 228 of sidewall 226. Head 232 is filled in such that no void is present within head 232, but other configurations can include a head that has a hollow interior. The configuration of head 232 in FIG. 3 can provide additional strength and rigidity to plant edging 220, and can be an aesthetically pleasing top to plant edging 220 because plant edging 220, when installed, is mostly buried by soil and landscaping material 240. While head 232 is shown as having a circular cross section, head 232 can have other shapes and configurations, such as an oval shape, a square or rectangular shape, a triangular shape, or another shape. Also, head 232 can extend directly upward from top end 228 of sidewall 226 such that a portion of head 232 is on inner side 222 and a portion of head 232 is on outer side 224. As may be desired, the shape and configuration of head 132 can vary along a horizontal length of plant edging 220 (i.e., into the page in FIG. 4).

Lift lip 248 connects bottom end 230 of sidewall 226 and rib 234 to form a triangular-shaped member connected to outer side 224 of bottom end 230 of sidewall 226. Lift lip 248 can be filled such that no void is present within lift lip 248, as shown in FIG. 4, or can have a hollow interior. The configuration of lift lip 248 can provide additional strength and rigidity to plant edging 220, including bottom end 230 and rib 234. Further, the configuration of plant edging 220 including lift lip 248 provides a greater downward-facing surface area to which teeth 238 can be connected to and extend from to engage the soil or another material.

Bottom end 230, rib 234, and lift lip 248 can have other shapes and configurations, including a stair-stepping configuration, a curved configuration, or another shape. The shape and configuration of bottom end 230, rib 234, and lift lip 248 can vary along a horizontal length of plant edging 220 (i.e., into the page in FIG. 4).

FIG. 5A is a perspective view of another embodiment of a plant edging, and FIG. 5B is a cross-sectional elevation view of the plant edging of FIG. 5A. Plant edging 320 includes radially inner side 322, radially outer side 324, sidewall 326, head 332, rib 334 with distal end 336, and teeth 338. Sidewall includes top end 328, bottom end 330, and hoop 331 at bottom end 330. Angle $\theta_1$ is an angle between vertical line L and rib 334, while angle $\theta_2$ is an angle between vertical line L and radially outer side 324 of sidewall 326. The configuration and functionality of plant edging 320 is similar to that of plant edging 20 of FIGS. 1A-1E and 2, plant edging 120 of FIG. 3, and plant edging 220 of FIG. 4. Like plant edging 20, plant edging 320 is configured to be a continuous and unending ring that surrounds and protects a plant or a number of plants, delineates the soil on radially inner side 322 from the landscaping materials on radially outer side 324, and provides a surface that a fabric used in landscaping can rest upon to form a seal between rib 334 and the fabric so that landscaping material cannot seep into an area within plant edging 320.

Plant edging 320 can be constructed from the same materials as plant edging 20. Plant edging 320 can be one continuous and monolithic piece that is molded or otherwise formed concurrently, or plant edging 320 can be a number of pieces fastened together through various means. Similar to plant edging 20, plant edging 320 can be any size, including a configuration that has a diameter measured between opposite sides of a radially innermost point of head 332 that is approximately 20.32 centimeters (8.0 inches) or 45.72 centimeters (18.0 inches). Further, while plant edging 320 is shown in FIGS. 5A and 5B as a circular ring, plant edging 320 can have other shapes, such as a triangle, oval, rectangle, pentagon, hexagon, or others. Plant edging 320 can have a variety of heights depending on a depth of the landscaping material, a size and type of plant within plant edging 320, the type of material used within plant edging 320, and other considerations. For example, plant edging 320 can have a height that is approximately 12.45 centimeters (4.9 inches). Plant edging 320 can have any thickness depending on the strength/rigidity needed, the type of material plant edging 320 is constructed from, and the type and density of soil and the landscaping material. The height of plant edging 320 can vary along a circumferential length of plant edging 320, and a thickness of plant edging 320 can vary along the height and/or circumferential length of plant edging 320, including a greater thickness at bottom end 330 than a thickness at top end 328.

Sidewall 326 is angled/slanted inward such that top end 328 is radially inward from bottom end 330. Sidewall 326 is angled from vertical line L at angle $\theta_2$. Sidewall 326 can be slanted at any angle $\theta_2$ when measured from vertical line L (i.e., perpendicular to a plane formed by a bottom of plant edging 320). In plant edging 320, sidewall 326 is slanted at angle $\theta_2$ that is an approximately ten degree angle, but angle $\theta_2$ can be more or less depending on design considerations and preferences. On bottom end 330 of sidewall 326 is hoop 331, which is an unslanted, downwardly extending cylinder. Hoop 331 and the slanted portion of sidewall 326 connect to one another near a point where rib 334 and sidewall 326 connect. Hoop 331 can provide more strength and rigidity in plant edging 320 in the area near bottom end 330. While the embodiment of plant edging 320 in FIGS. 5A and 5B is shown to have hoop 331, other embodiments with a slanted sidewall 326 do not need to include hoop 331.

Rib 334 extends from radially outer side 324 at a point near where sidewall 326 and hoop 331 connect. Rib 334 is similar to rib 34 of FIGS. 1A-1E and 2. However, as shown in FIGS. 5A and 5B, rib 334 extends from radially outer side 324 at angle $\theta_1$ that is approximately sixty degrees when measured from vertical line L (i.e., perpendicular to a plane formed by a bottom of plant edging 320). While $\theta_1$ is shown as a sixty degree angle, angle $\theta_1$ can be more or less depending on design considerations and preferences. With angle $\theta_1$ being sixty degrees, rib 334 extends further radially outward than if angle $\theta_1$ was smaller because distal end 336 of rib 334 extends to a point that is on a plane formed by a bottom of plant edging 320 and, particularly, formed by a bottom side of hoop 331.

Head 332 has the same functionality as head 32 in FIGS. 1A-1E and 2, but head 332 extends radially inward from radially inner side 322 of top end 328. Head 332 can have a variety of configurations, including a solid circular cross-sectional member, a semi-circular cross-sectional member, a shepherds-hook shaped cross-sectional member, a rectangular cross-sectional member, a triangular cross-sectional member, or another configuration. Further, other embodiments of plant edging 320 can include a configuration in which head 332 extends radially outward from radially outer side 324 of top end 328 or a configuration that does not include a head. In FIGS. 5A and 5B, head 332 is a semi-circular cross-sectional member. Head 332 can have a hollow interior (within the semi-circular section) or can be filled such that no void is present within head 332. Head 332 provides strength and rigidity to plant edging 320, and can be configured to be an aesthetically pleasing top to plant edging 320. Because plant edging 320 is mostly buried by soil and landscaping material, head 332 may be the only component of plant edging 320 that is in view after plant edging 320 has been installed. Thus, it may be desirable for head 332 to be aesthetically pleasing, such as a color, coating, or material that is different than the other components of plant edging 320. Further, as may be desired, the shape and configuration of head 332 can vary along a circumferential length of plant edging 320.

Teeth 338 are downwardly extending projections on a bottom side of hoop 331 and on a bottom side of distal end 336 of rib 334. Teeth 338 are able to engage soil or a material on which plant edging 320 is located by digging into the material. Teeth 338 can have any configuration as needed, such as a trapezoidal shape as shown in FIGS. 5A and 5B. Teeth 338 can be present on neither, one, or both of hoop 331 and distal end 336 of rib 334.

With plant edging 320 having an angled/slanted sidewall 326 such that a top of the planter ring has a diameter that is smaller than a diameter of a bottom of the planter ring, multiple annular plant edgings 320 can be stacked on one another during storage and transportation to increase efficiency and save space.

FIGS. 6A-6D illustrate another embodiment of a plant edging, wherein plant edging 420 includes a radially inner side or surface 422, a generally opposed outer side or surface 424, an annular wall 426, head 432, and rib 434. Annular wall 426 includes an upper end 428 and a bottom end 430. Angle $\theta_1$ is an angle between vertical line L and rib 434, while angle $\theta_2$ is an angle between vertical line L and outer surface 424 of annular wall 426. Like plant edging 20, plant edging 420 is configured to be a continuous and unending ring that surrounds and protects and plant or a number of plants, delineates the soil on a radially inner side 422 from the landscaping materials on radially outer side 424, and provides a surface that a fabric or film used in landscaping can rest upon to form a barrier between rib 434 and the film so that landscaping material is impeded from seeping into an area within plant edging 420.

Plant edging 420 may be constructed from the same materials as plant edging 20. Plant edging 420 may be one continuous and monolithic piece that is molded or otherwise formed concurrently, or plant edging 420 may be a number of pieces fastened together through various means. Similar to plant edging 20, plant edging 420 may be any size, including a configuration that has a diameter measured between opposite sides of a radially innermost point of head 432 that is approximately 20.32 cm (8.0 in) or 45.72 cm (18.0 in). Further, while plant edging 420 is shown in FIGS. 6A-6D as a circular ring, plant edging 420 may have other shapes, such as a triangle, oval, rectangle, pentagon, hexagon, or others. Plant edging 420 may have a variety of heights depending on a depth of the landscaping material, a size and type of plant within plant edging 420, the type of material used within plant edging 420, and other considerations. For example, plant edging 420 may have a height that is approximately 12.45 cm (4.9 in). Plant edging 420 may have any thickness depending on the strength/rigidity required, the type of material plant edging 420 is constructed from, and the type and density of soil and the landscaping material. The height of plant edging 420 may vary along a circumferential length of plant edging 420, and a thickness of plant edging 420 may vary along the height and/or circumferential length of plant edging 420, including a greater thickness at lower end 430 than a thickness at upper end 328.

Annular wall 426 may be angled/slanted/sloped inwardly such that upper end 428 is radially inward from lower end 430. In other words, upper end 428 may have a first diameter that is smaller than a second diameter of the lower end 430. Annular wall 426 may accordingly be considered frustoconical in shape. Annular wall 426 may be angled or sloped from vertical line L at angle $\theta_2$. While wall 426 may be consistently or inconsistently sloped at any angle $\theta_2$ when measured from vertical line L (i.e., perpendicular to a plane formed by a bottom of plant edging 420), wall 426 may preferably be sloped at an angle $\theta_2$ of between about 5-30°, but may be more or less depending on design considerations and preferences. In a particular embodiment, angle $\theta_2$ may be approximately 10°.

Rib 434 is connected to and extends outwardly from outer surface 424 near bottom end 430 of wall 426. Rib 434 extends from outer surface 424 at an angle $\theta_1$ that is between about 90-150° when measured from vertical line L (i.e. perpendicular to a plane formed by bottom of plant edging 420). In some embodiments, angle $\theta_1$ may be between about 100-140°, and more preferably between about 110-130°. Rib 434 may be similar to rib 34 of FIGS. 1A-1E and 2, and may terminate in a distal end 436.

Head 432 preferably has the same functionality as head 32 in FIGS. 1A-1E and 2, but head 432 extends curvilinearly and radially inward from upper end 428 of wall 426, and terminates at annular lip 433. In the illustrated embodiment, annular lip 433 and upper end 428 of wall 426 are contained in a first plane 435. Head 432 may have a variety of configurations, including a solid circular cross-sectional member, a semi-circular cross-sectional member, a shepherds-hook shaped cross-sectional member, or other configuration. Head 432 may have a hollow interior, or may be filled such that no void is present within head 432. Head 432 provides strength and rigidity to plant edging 420, and may be configured to be an aesthetically pleasing top to plant edging 420. In addition, head 432 may be configured to engage with an upper edge of conventional plant edging, such as that which may already be present at the landscaping location. In such embodiments, head 432 may engage over the top of such another plant edging section or material. Because plant edging 420 may be mostly buried by soil and landscaping material, head 432 may be the only component of plant edging 420 that is in view after plant edging 420 has been installed. Thus, it may be desirable for head 432 to be aesthetically pleasing, such as a color, coating, shape, or material that is different than the other components of plant edging 420. Further, as may be desired, the shape and configuration of head 432 may vary along a circumferential length of plant edging 420.

Plant edging 420 includes one or more openings 450 in annular wall 426 that are configured to receive irrigation piping therethrough. Opening 450 therefore extends through a thickness of annular wall 426, and may be configured as desired to properly support and permit passage of irrigation piping therethrough. In some embodiments, an array of openings 450 may be distributed equidistantly or otherwise about annular wall 426.

Irrigation openings 450 may serve an important function in facilitating irrigation techniques to planting beds. In the absence of plant edging 420, conventional planting beds cover the soil between plants with a landscaping fabric, and cover the landscaping fabric with landscaping material (such as landscaping material 40, 140, 240) as illustrated in FIGS. 2-4. Where irrigation of the plants is desired, installers typically place irrigation equipment between the landscaping fabric and the landscaping material. The irrigation equipment includes water conduits that may or may not be perforated, and optionally sprinkler heads that irrigate from distinct locations either above the level or the landscaping material, or from within spaces formed in the landscaping material layer. Conventional planting bed irrigation techniques therefore typically irrigate not only the plant, but also the surrounding area. In doing so, a significant portion of the irrigation water is wasted by not being confined to the plant and its roots, and instead is emitted onto the landscaping bed where plant growth is not desired. In addition to this unnecessary use of water, the excess irrigation water not applied to the plant tends to form a "runoff" flow from the plant bed due to the low water permeability of the landscaping fabric. Irrigation water emitted onto the landscaping bed, and not into the soil at or adjacent the plant, tends to flow over the upper surface of the landscaping fabric, following gravity away from a distributed area over the planting bed. The runoff flow can itself be a detriment to the planting bed by carrying and spreading soil over the top of the landscaping fabric, which can lead to undesired weed growth, and the depositing of minerals and other contaminants onto the landscaping material. Such minerals and contaminants may discolor or otherwise aesthetically degrade the landscaping material. Irrigation flow over and through the landscaping material over an extended period of time may also lead to decomposition of natural landscaping material.

Irrigation openings 450 may preferably be positioned at plant edging 420 such that, when plant edging 420 is installed as shown in FIGS. 2-4, irrigation openings 450 are above the landscaping fabric. In this manner, irrigation conduit may be installed after the installation of the landscaping fabric, and optionally after the placement of landscaping material on top of the landscaping fabric. The irrigation conduit may be received in and/or through irrigation opening 450 so that the output from such irrigation conduits may be isolated within the boundary defined by plant edging 420. Irrigation systems operating in conjunction with plant edging 420 (or any plant edging of the present invention) may therefore utilize openings 450 to reduce or eliminate excess irrigation water use, and instead facilitate focused irrigation upon the plant or plants within the plant boundary defined by plant edging 420. In an example embodiment, irrigation conduit may connect to, or extend through one or more respective irrigation openings 450 in plant edging 420, and may be arranged to emit irrigation water through, for example, irrigation dispensing heads or perforated conduits arranged to emit irrigation water only at targeted regions such as within the boundary defined by plant edging 420. In some embodiments, irrigation dispensing heads may be coupled to or otherwise supported by plant edging 420, with the irrigation dispensing heads being arranged to irrigate only a target zone defined within boundary set by plant edging 420. Irrigation dispensing heads may be discrete units connected to or supported by plant edging 420, or may be integrally formed with plant edging 420. It is contemplated that a variety of targeted irrigation systems may be facilitated by irrigation openings 450. It is further contemplated that the plant edging of the present invention may be configured to connect to and/or facilitate the implementation of a targeted irritation system that utilizes the body of the plant edging to support one or more irrigation equipment components (whether or not at or through openings 450) to irrigate the zone within a boundary defined by the plant edging. A method of the present invention generally includes the provision of a plant edging as described herein, and an irrigation system supported by the plant edging, wherein the irrigation system includes an orifice that is arranged to emit irrigation fluid to a zone within a boundary defined by the plant edging. The orifice may be defined by an irrigation dispenser, such as a sprinkler head. In other embodiments, the orifice may be defined by one or more perforations in an irrigation conduit. The plant edging may support the one or more irrigation system components at an access opening 450 in annular wall 426.

Plant edging 420 may include a plurality of elongated slots 460 forming passages through annular wall 426. In some embodiments, elongated slots 460 may be arrayed substantially about an entirety of annular wall 426. The array of elongated slots 460 may be equidistantly spaced from one another about annular wall 426. In some embodiments, elongated slots 426 may be oriented parallel to one another along a general direction from lower end 430 toward upper end 428. The elongated slots 460 may represent passive water openings between a weed barrier film and an interior region defined by plant edging 420 to permit water and other nutrients to seep through annular wall 426 as nourishment to one or more plants positioned in the interior region defined by plant edging 420.

With plant edging 420 having an angled/slanted/sloped wall 426 such that an upper end 428 has a first diameter that is smaller than the second diameter of the lower end 430, multiple annular plant edgings 420 may be stacked upon one another during storage and transportation to increase efficiency and save space.

Figure 6A:
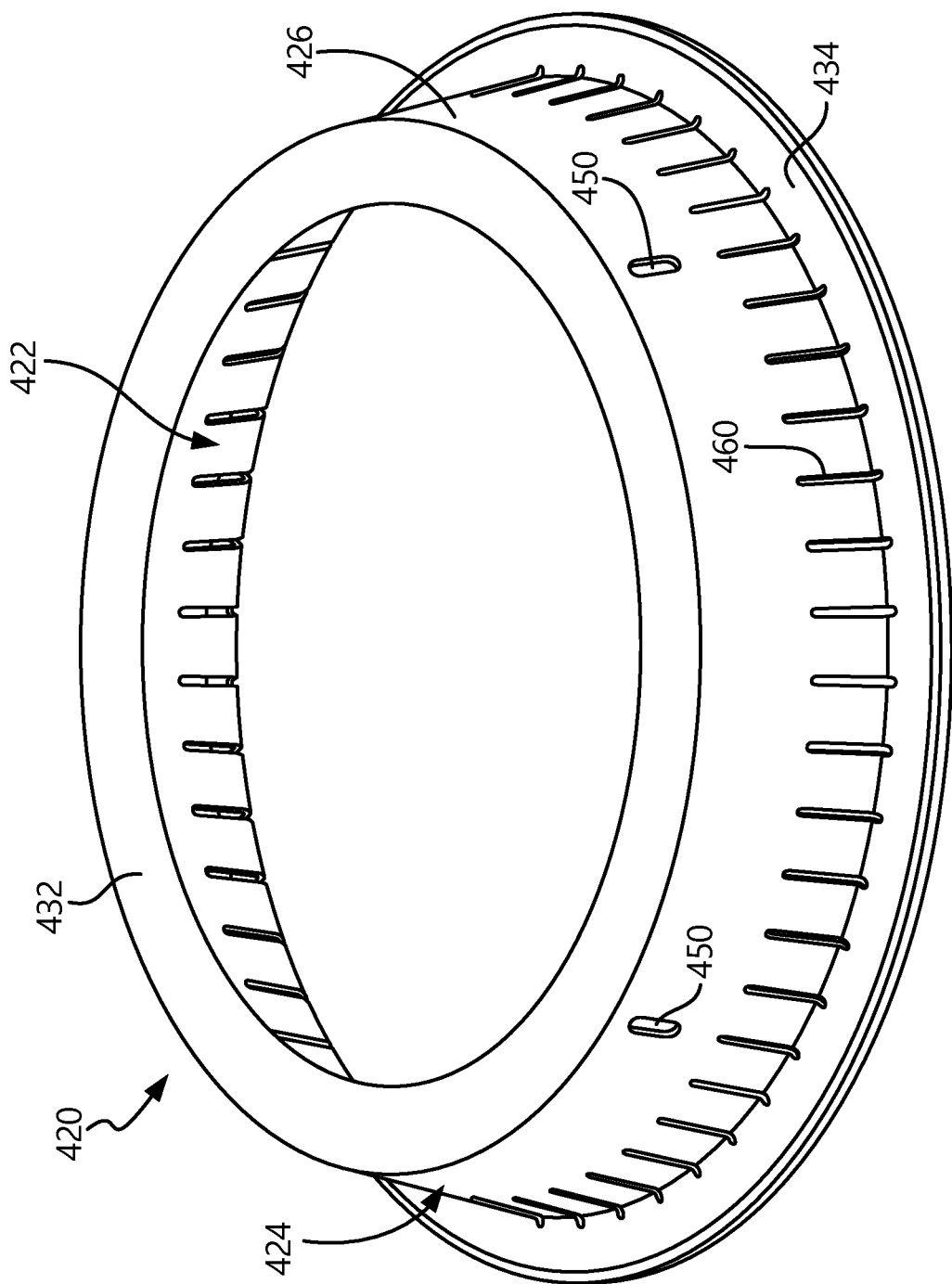
FIG. 6A is a perspective view of an embodiment of a plant edging.
Figure 6B:
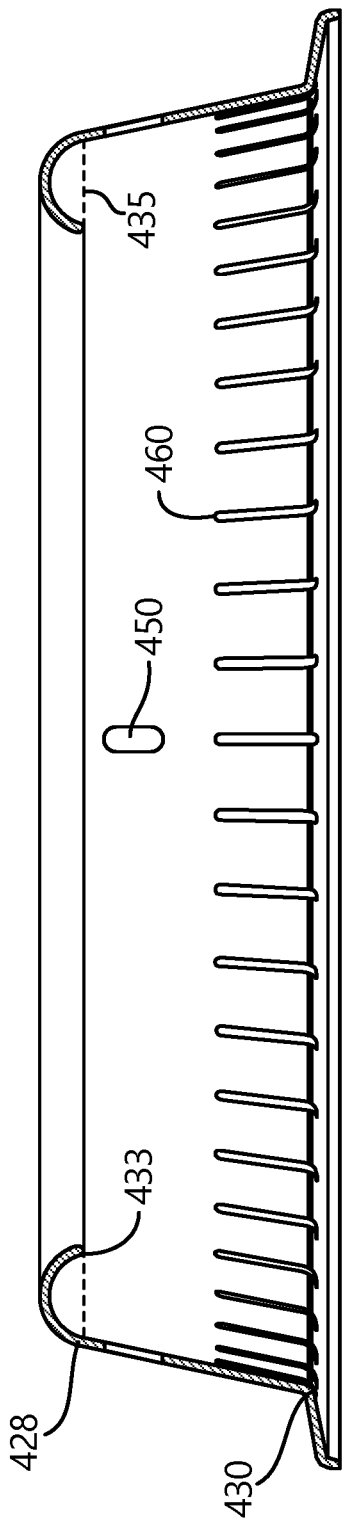
FIG. 6B is a cross-sectional elevation view of the plant edging of FIG. 6A.
Figure 6C:
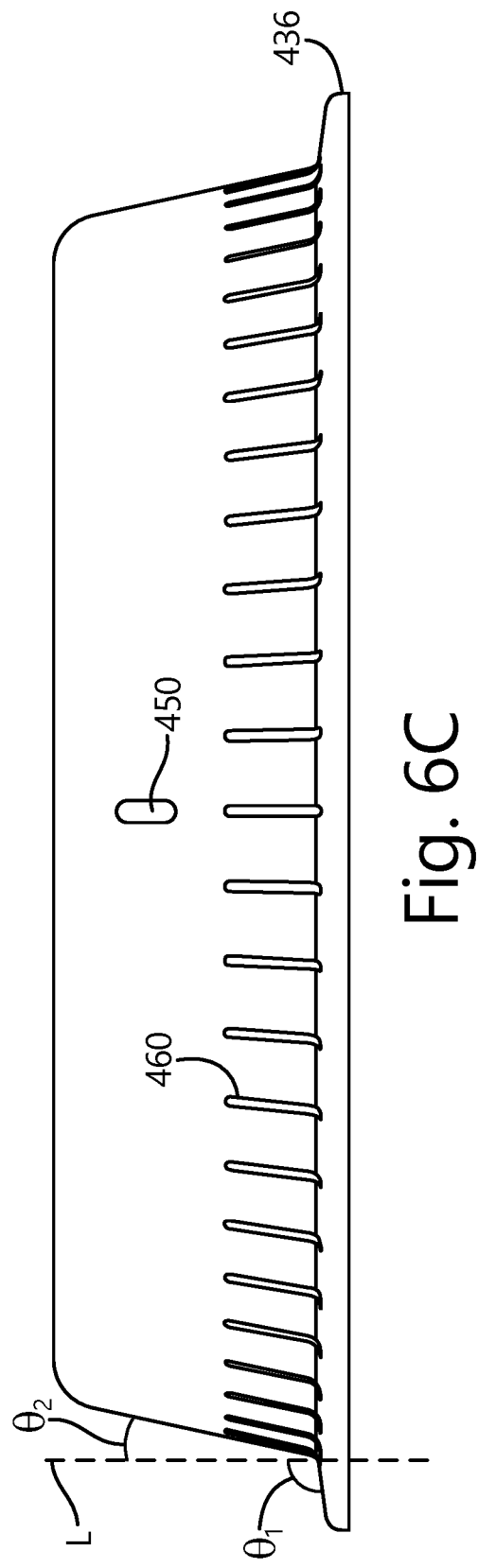
FIG. 6C is a side elevation view of the plant edging of FIG. 6A.
Figure 6D:
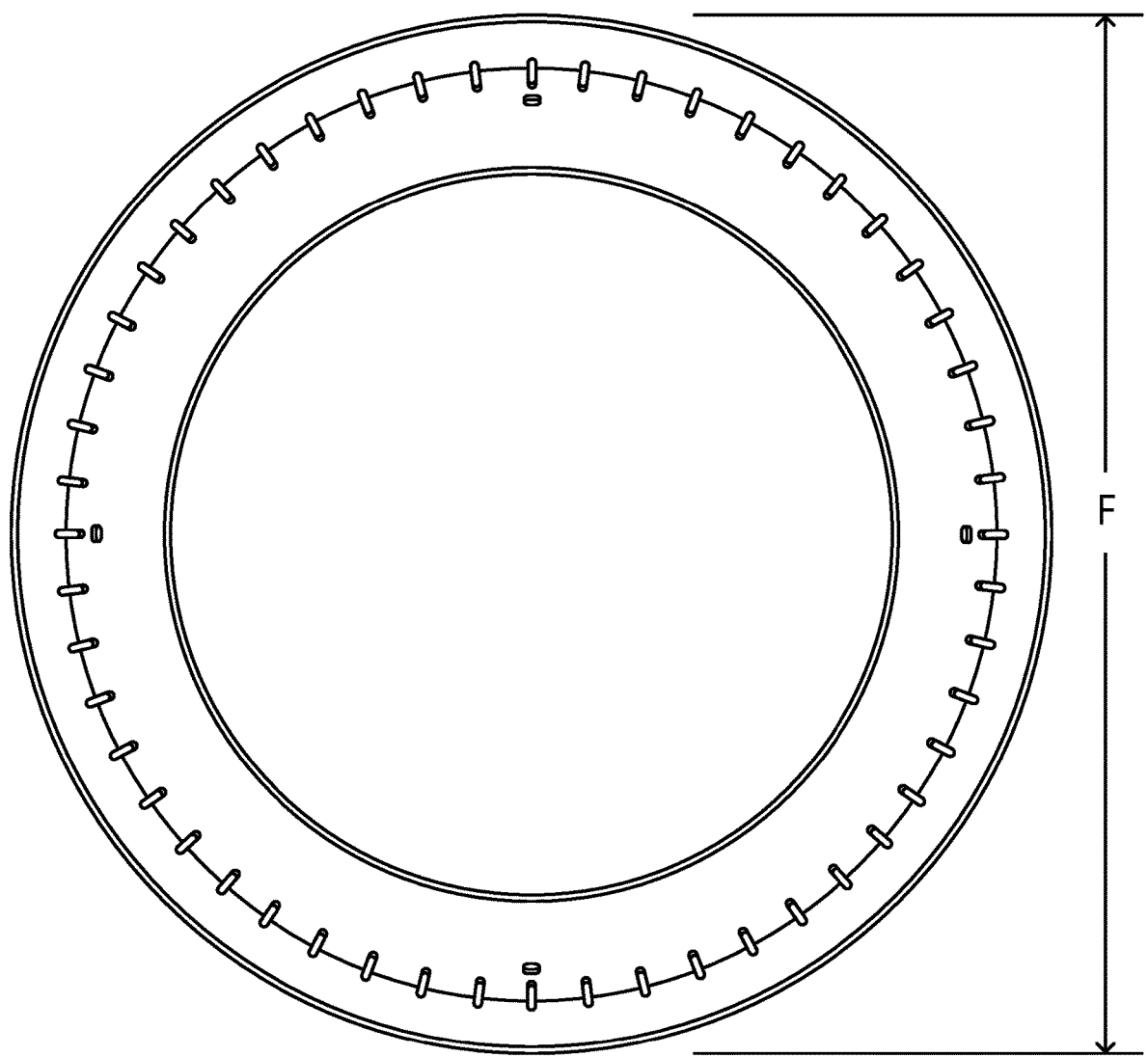
FIG. 6D is a top plan view of the plant edging in FIG. 6A.
Figure 7A:
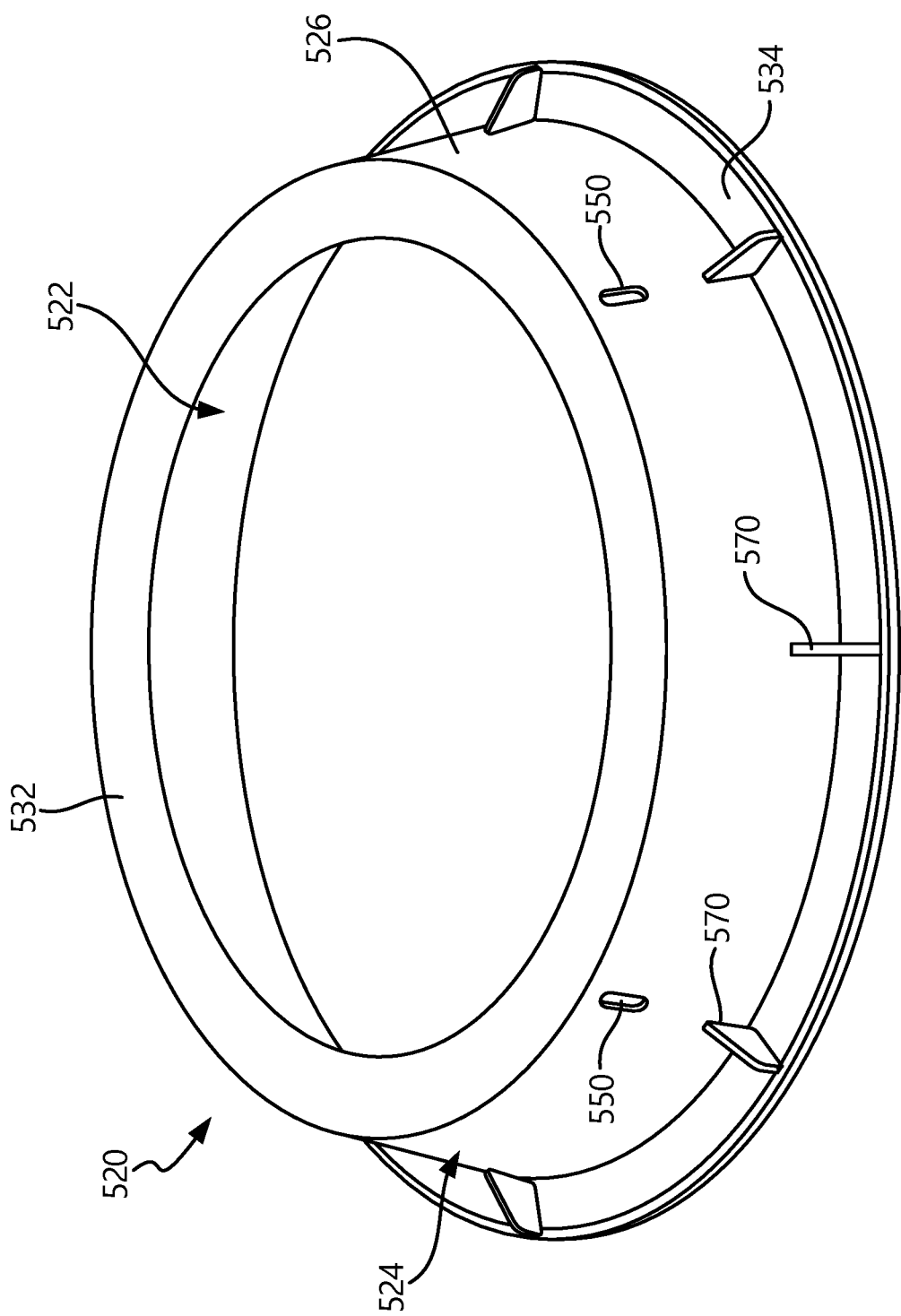
FIG. 7A is a perspective view of an embodiment of a plant edging.
Figure 7B:
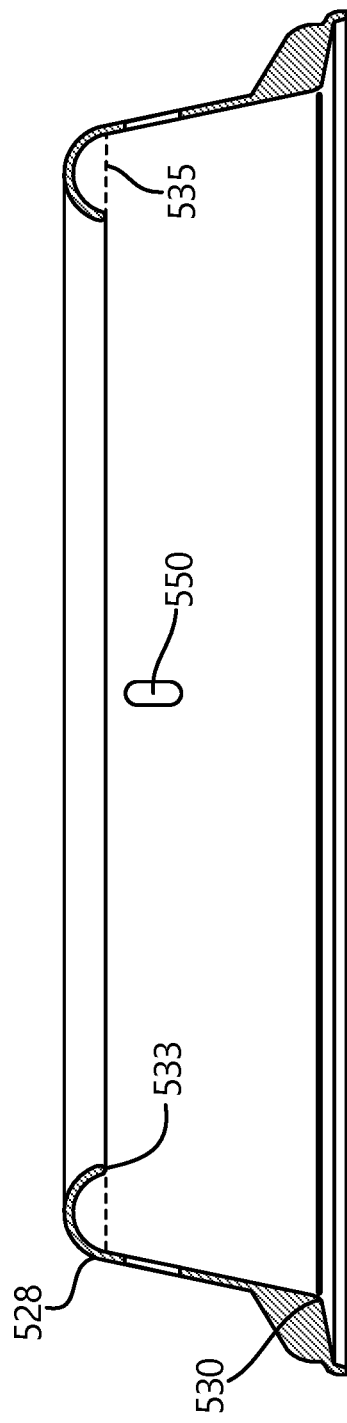
FIG. 7B is a cross-sectional elevation view of the plant edging of FIG. 7A.
Figure 7C:
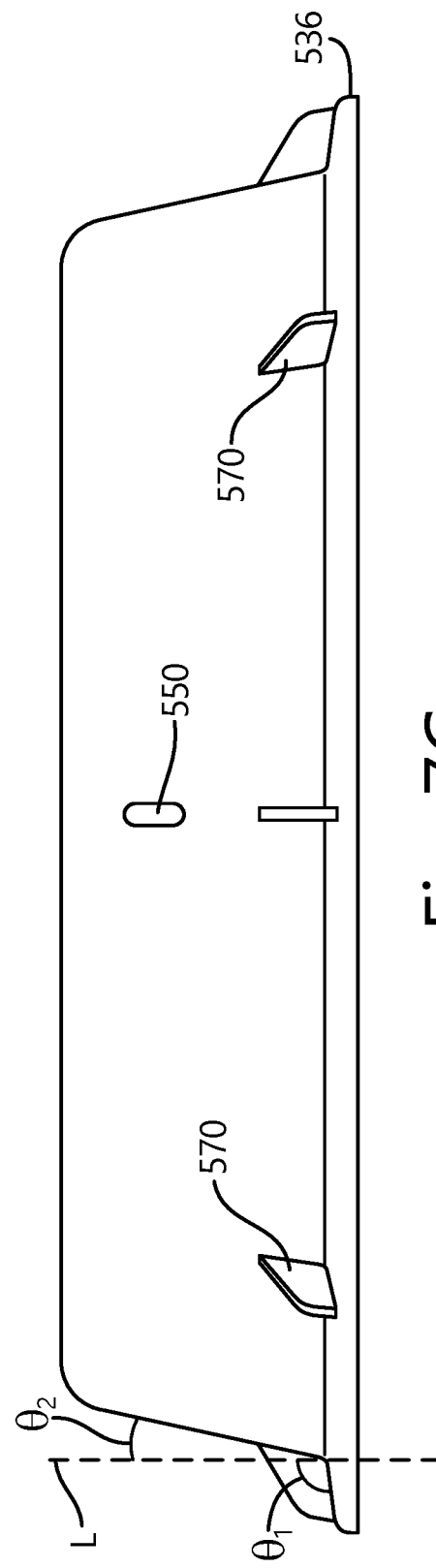
FIG. 7C is a side elevation view of the plant edging of FIG. 7A.
Figure 7D:
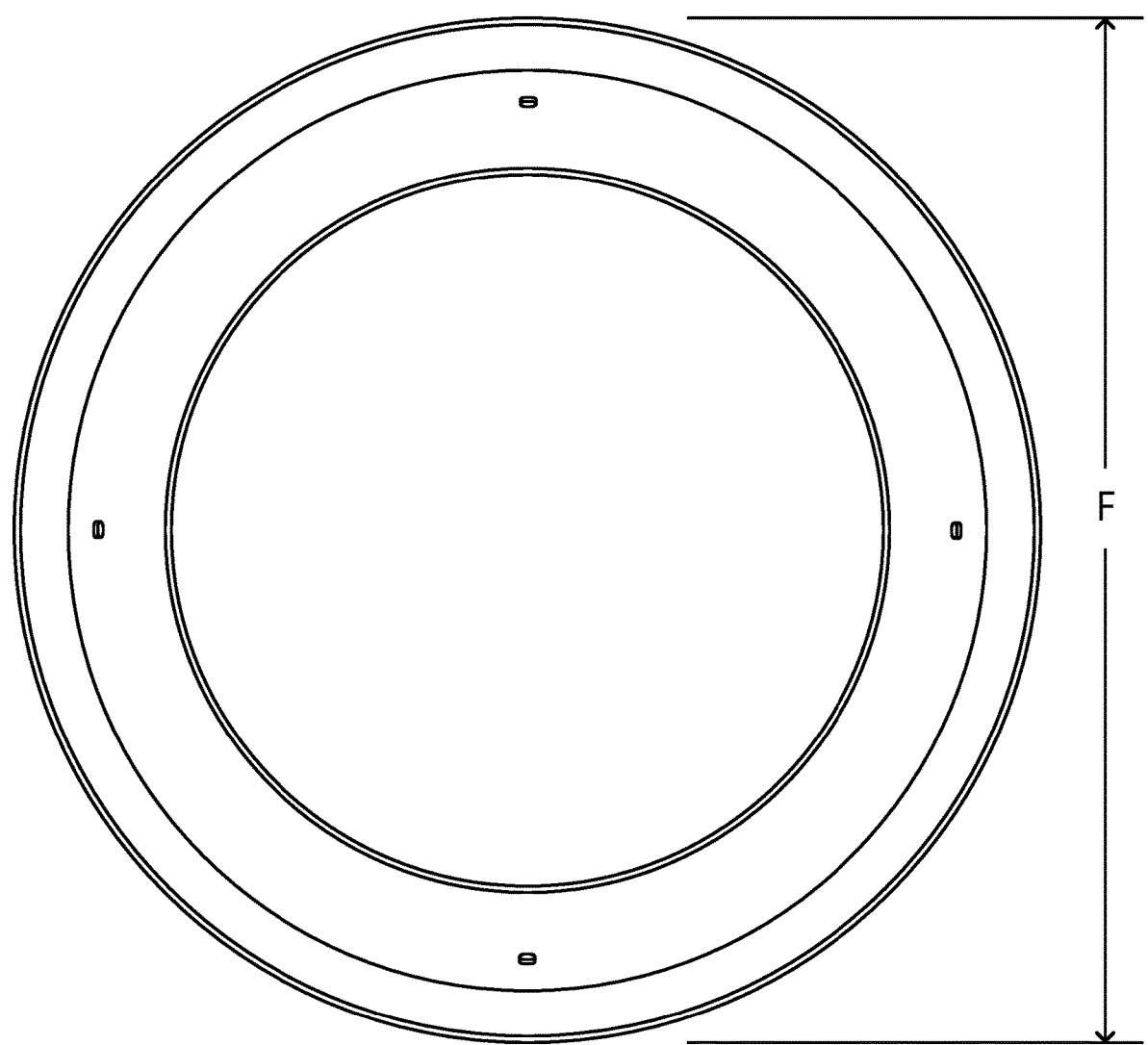
FIG. 7D is a top plan view of the plant edging in FIG. 7A.
Figure 8A:
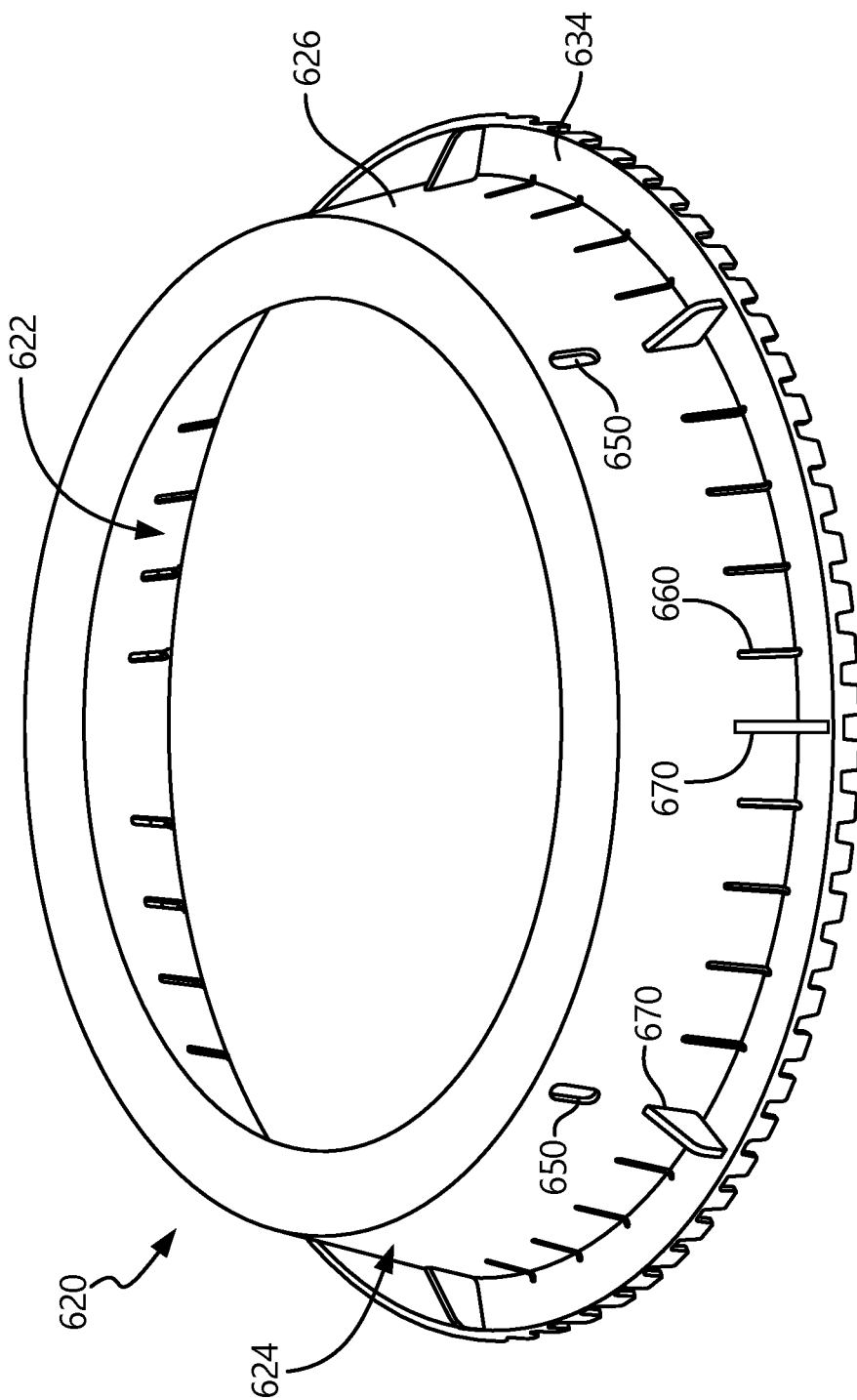
FIG. 8A is a perspective view of an embodiment of a plant edging.
Figure 8B:
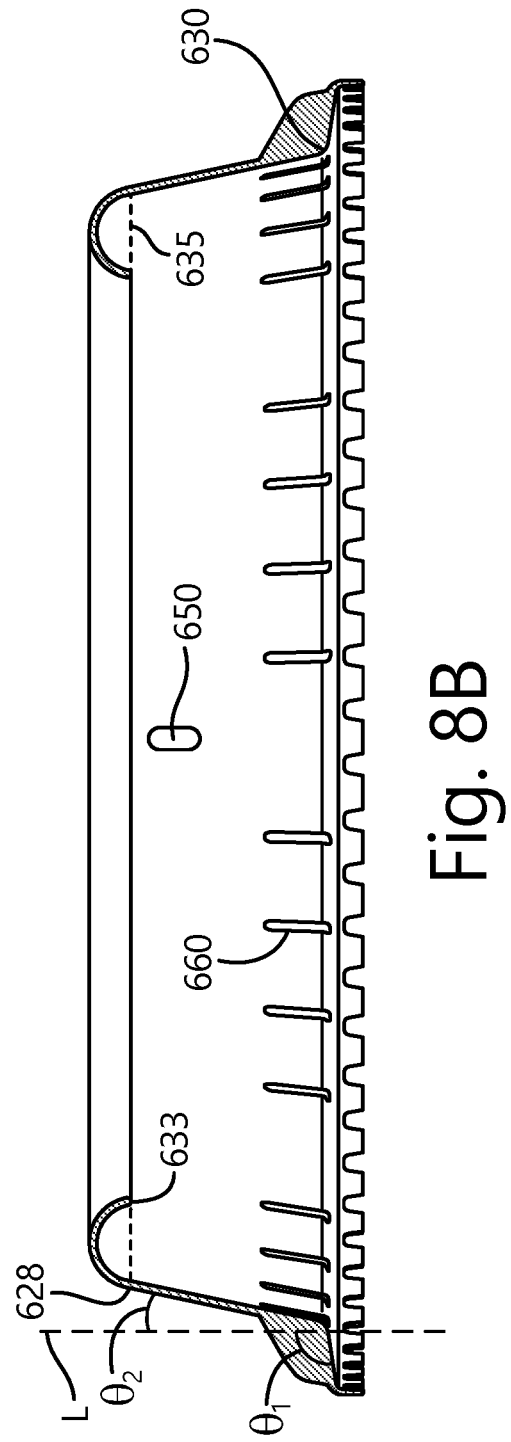
FIG. 8B is a cross-sectional elevation view of the plant edging of FIG. 8A.
Figure 8D:
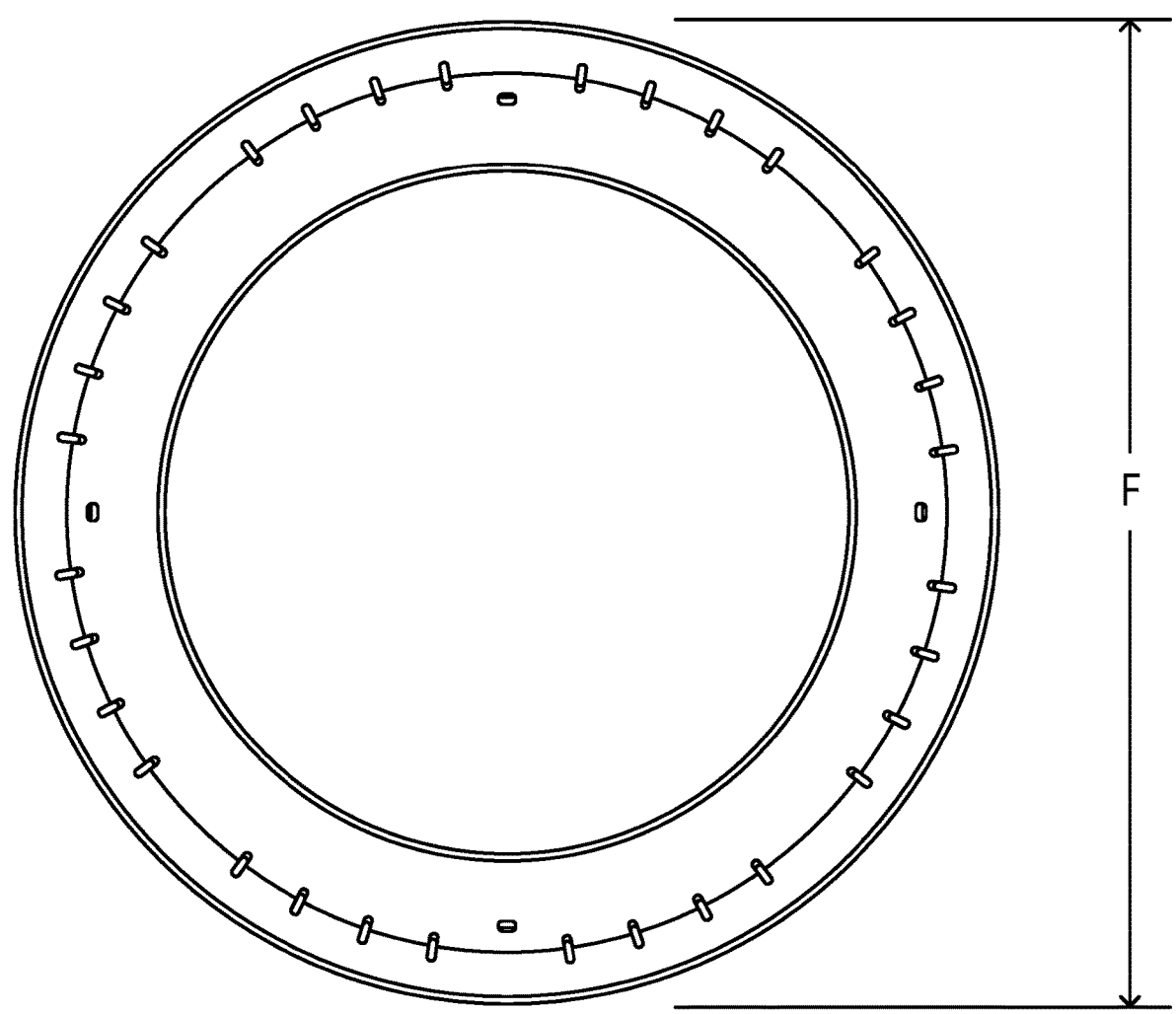
FIG. 8D is a top plan view of the plant edging in FIG. 8A.

A footprint F of plant edging 420 is illustrated in FIG. 6D, and may be defined as the largest area of a surface covered by plant edging 420 when plant edging 420 is positioned with rib 434 juxtaposed with such surface. In the illustrated embodiment, footprint F is a circle with the illustrated diameter. Other arrangements for footprint F are contemplated as a result of the variety of shapes of plant edging 420 contemplated by the present invention.

Another embodiment of plant edging 520 is illustrated in FIGS. 7A-7D. Similar to plant edging 420, plant edging 520 includes an inner side or surface 522, outer side or surface 524, annular wall 526 with an upper end 528 and lower end 530, head 532, and rib 534. Plant edging 520 is similar in configuration and functionality to plant edging 420, except that plant edging 520 does not include the plurality of elongated slots 460. However, plant edging 520 does include one or more stand-off plates 570 connected to outer surface 524 of wall 526 and to rib 534. In some embodiments, plant edging 520 may include a plurality of stand-off plates arrayed around wall 526, which array may include equidistantly-spaced stand-off plates 570. The stand-off plates 570 may be present to create an opening between outer surface 524 and the weed barrier film to permit water and other nutrients in around plant edging 520. Moreover, stand-off plates 570 may be provided as an aid in packaging and delivering, to maintain a gap between adjacent stacked plant edgings 520 that facilitates manual separation of the stacked plant edgings 520.

Another embodiment of plant edging 620 is illustrated in FIGS. 8A-8D. Similar to plant edging 420, plant edging 620 includes an inner side or surface 622, outer side or surface 624, annular wall 626 with an upper end 628 and a lower end 630, head 632, and rib 634. Plant edging 620 is similar in configuration and functionality to plant edging 420, 520 except that plant edging 620 includes both of the elongated slots 660 and one or more stand-off plates 670 connected to outer surface 624 of wall 626, and to rib 634.

Figure 9A:
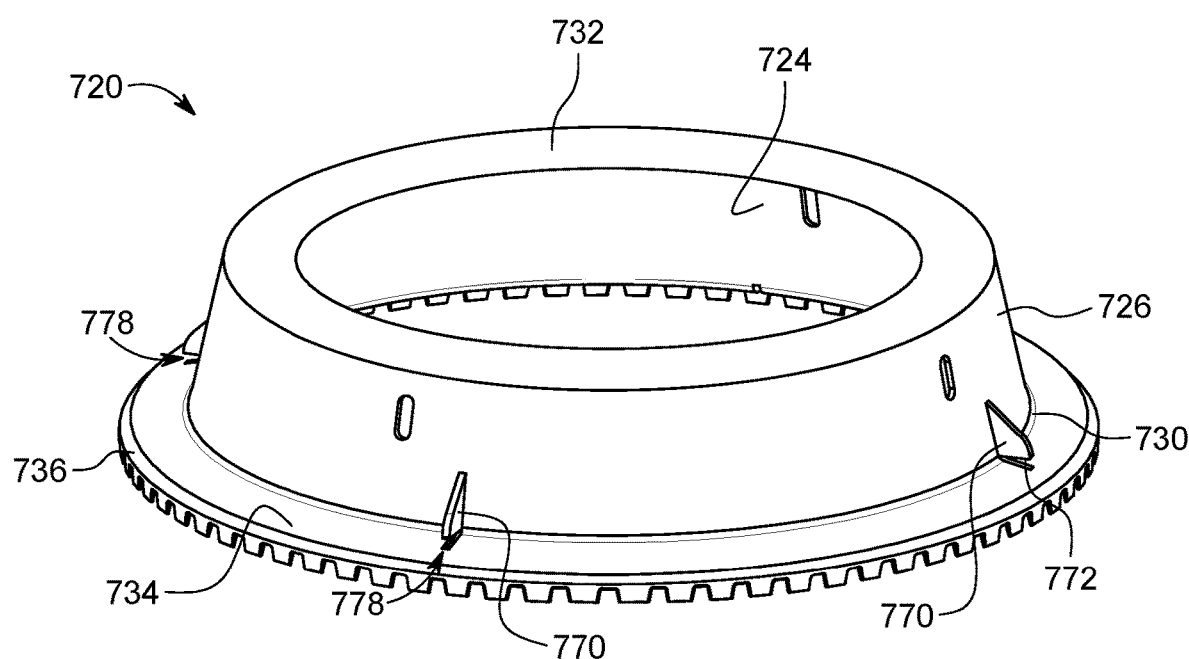
FIG. 9A is a perspective view of an embodiment of a plant edging.
Figure 9B:
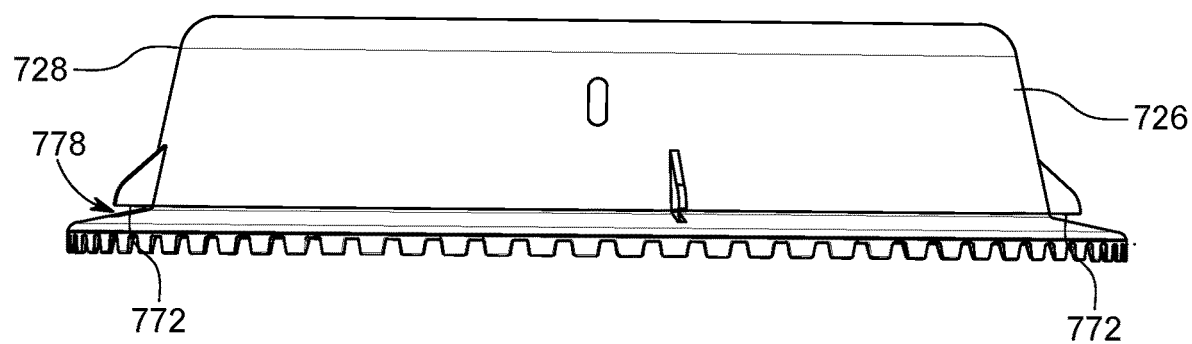
FIG. 9B is a side elevation view of the plant edging of FIG. 9A.

A still further embodiment of plant edging 720 is illustrated in FIGS. 9A and 9B. Plant edging 720 is similar to plant edging 520, except that stand-off plates 770 define a surface 772 that bounds at least a portion of a locking recess 778 for securing a barrier film, such as fabric 42, to plant edging 720. In the embodiment of FIGS. 9A and 9B, stand-off plates 770 extend from and are connected to annular wall 726, but are at least partially disconnected from rib 734 to define the locking recess of 778 between surface 772 and rib 734. Locking recess 778 is preferably configured to engage and secure a barrier film in a manner that substantially forms a seal between plant edging 720 and the barrier film 42. Although locking recess 778 is illustrated as being defined between bounding surface 772 of stand-off plate 770 and rib 734, it is contemplated that locking recess 772 may be otherwise defined between a bounding surface of stand-off plate 770 and annular wall 726, and/or between one or more bounding surfaces of stand-off plate 770.

Figure 10A:
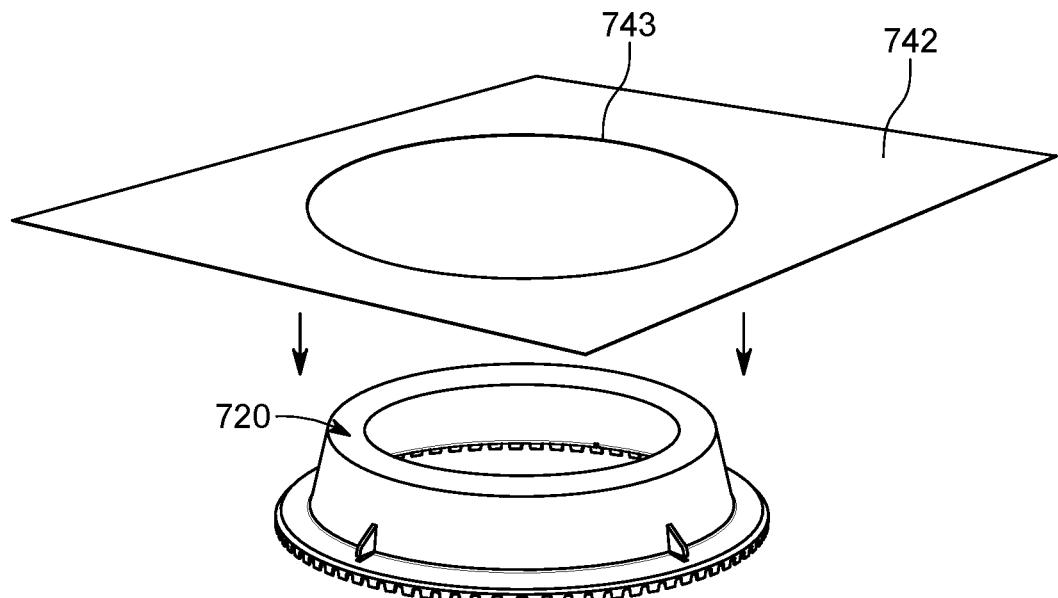
FIG. 10A is a schematic illustration of a barrier being installed with a plant edging.
Figure 10B:
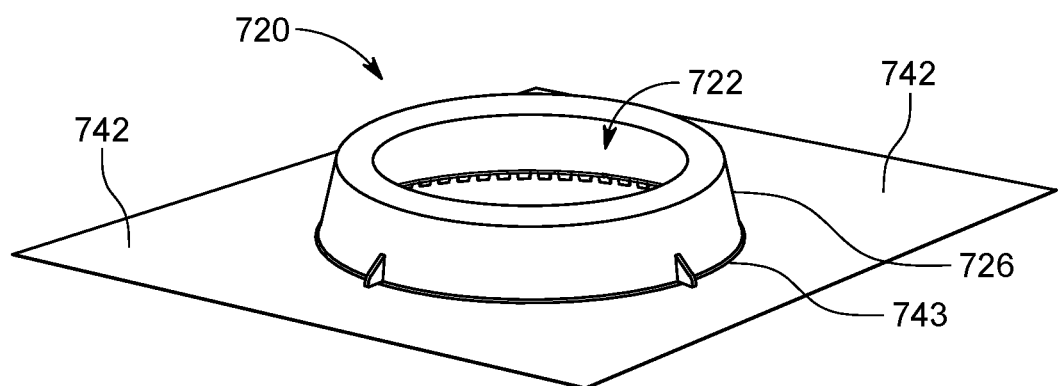
FIG. 10B is a schematic illustration of a plant edging used in connection with a barrier.

FIGS. 10A and 10B illustrate a process for engaging a barrier film 742 to plant edging 720. In this embodiment, barrier film 742 includes an opening 743 through which annular wall 726 may be positioned. As shown in the progression from FIG. 10A to FIG. 10B, barrier film 742 may be positioned in proximity to a ground surface, with annular wall 726 of plant edging 720 extending through opening 743 in barrier film 742. To secure barrier film 742 to plant edging 720, barrier film 742 may be inserted into respective locking recesses 778. The combination of plant edging 720 and barrier film 742 are located so the plant 46 is capable of extending through an upper opening 722 of plant edging 720.

Plant edging 20/120/220/320/420/520/620/720, which can also be configured in a ring to form a planter ring, is disclosed herein having sidewall 26/126/226/326/426/526/ 626/726, head 32/132/232/332/432/532/632/732 at top end 28/128/228/328/428/528/628/728 of sidewall 26/126/226/

326/426/526/626/726, and rib 34/134/234/334/434/534/634/734 connected to and extending away from outer side 22/122/222/322/422/522/622/722 of plant edging 20/120/220/320/420/520/620/720. Plant edging 20/120/220/320/420/520/620/720 provides protection to plants on inner side 24/124/224/324/424/524/624/724 and delineation from grass or other landscaping materials on outer side 22/122/222/322/422/522/622/722. Rib 34/134/234/334/434/534/634/734, also called a branch, can form a substantially V-shape with bottom end 30/130/230/330/430/530/630/730 of sidewall 26/126/226/326/426/526/626/726. Rib 34/134/234/334/434/534/634/734 is configured to engage soil or landscaping material 42/142/242, such as stone/gravel, wood chips, or sand, to prevent plant edging 20/120/220/320/420/520/620/720 from shifting or being pulled out of the ground. Rib 34/134/234/334/434/534/634/734 is also configured to engage fabric 42/142/242, which is a film or liner that is commonly utilized in landscaping, with rib 34/134/234/334/434/534/634/734 by providing an angled surface to create a seal between plant edging 20/120/220/320/420/520/6200/720 and fabric 42/142/242 that prevents soil or landscaping material 40/140/240 from seeping through an interface between the two. Rib 34/134/234/334/434/534/634/734 can extend at any angle and can be any length, including an angle that is as much as or more than sixty degrees from sidewall 26/126/226/326/426/526/626/726 and a length in which distal end 36/136/236/336/436/536/636/736 of rib 34/134/234/334/434/534/634/734 extends further downward than bottom end 30/130/230/330/430/530/630/730 of sidewall 26/126/226/326/426/526/626/726. Further, rib 34/134/234/334/434/534/634/734 and bottom end 30/130/230/330/430/530/630/730 of sidewall 26/126/226/326/426/526/626/726 (the V-shape) can form lift lip 248 that connects distal end 36/136/236/336/436/536/636/736 of rib 34/134/234/334/434/534/634/734 and bottom end 30/130/230/330/430/530/630/730 to form a triangular member at the bottom of pant edging 20/120/220/320/420/520/620/720 for more support and strength. Teeth 38/138/238/338 can be located on bottom end 30/130/230/330/430/530/630/730 of sidewall 26/126/226/326/426/526/626/726 and on distal end 36/136/236/336/436/536/636/736 of rib 34/134/234/334/434/534/634/734 to aid in engagement of plant edging 20/120/220/320/420/520/620/720 with the soil or landscaping material 40/140/240.

The plant edging of the present invention is envisioned for use in connection with a barrier film, such as landscape fabric, to establish a weed-inhibited zone for plantings, wherein the plant edging interacts with the barrier film to substantially seal an opening in the barrier film made for the planting. The plant edging of the present invention therefore provides a mechanism to substantially seal openings in weed-inhibiting barrier films, so that the act of planting through a barrier film does not introduce an opportunity for weed growth at the opening.

To inhibit weed growth in proximity to a plant, a plant edging as described herein may form a partial enclosure through which a plant may grow, with an outer side of the partial enclosure engaging with a barrier film. The plant edging may preferably have a sloped wall defining a partial enclosure with an inner surface, and a generally opposed outer surface. The sloped wall of the plant edging may include an upper end surrounding an upper opening to the partial enclosure and a lower end, with the sloped wall sloping inwardly from the lower end toward the upper end. Such a plant edging, as described elsewhere herein, includes a head connected to and extending inwardly from the upper end of the wall, and a rib connected to and extending outwardly from and about the outer surface and terminating in an outer edge. A barrier film, such as fabric 42/142/242 may be placed in proximity to a ground surface, and the rib 34/134/234/334/434/534/634/734 of the plant edging 20/120/220/320/420/520/620/720 may be inserted through an opening in the barrier film 42/142/242 so that the barrier film 42/142/242 is juxtaposed with the upper surface of the rib 34/134/234/334/434/534/634/734 about the outer surface of the sloped wall 26/126/226/326/426/526/626/726, and so that the plant is capable of extending through the upper opening of the partial enclosure.

Figure 11:
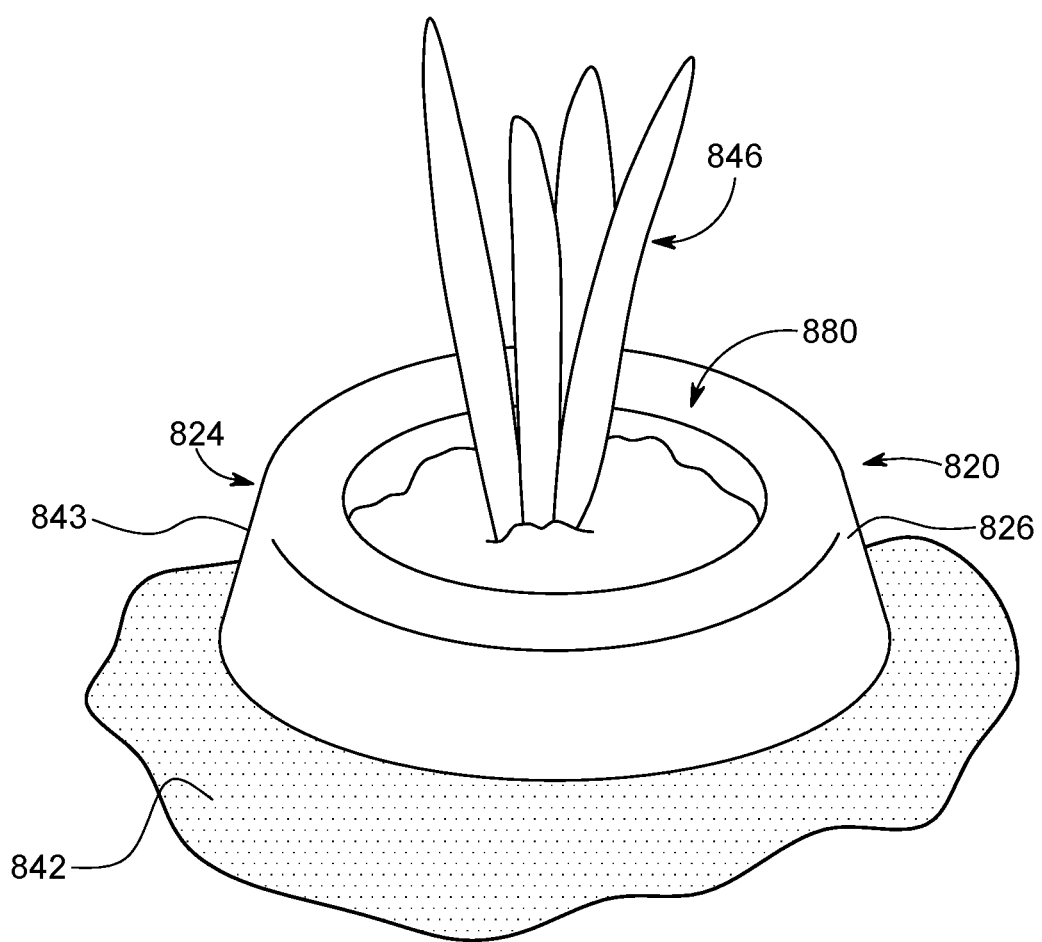
FIG. 11 is a schematic illustration of a plant edging used in connection with a barrier film.

An example arrangement of the present invention is illustrated in FIG. 11, wherein a plant edging 820 has been inserted through an opening 843 in barrier film 842 so that the barrier film 842 is juxtaposed with the upper surface of the rib (not shown) about the outer surface 824 of sloped wall 826. The plant 846 is illustrated as extending through the upper opening 880 defined by plant edging 820. As depicted in FIG. 11, opening 843 in barrier film 842 is smaller than a plant edging footprint defined by the rib, wherein the rib is tucked underneath the barrier film 842 when installed through opening 843.

Any relative terms or terms of degree used herein, such as "substantially," "essentially," "generally," "approximately," and the like should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations; incidental alignment variations; alignment or shape variations induced by thermal, rotational, or vibrational operational conditions; and the like. While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A plant edging, comprising:
   an annular frustoconical wall having an inner surface and a generally opposed outer surface, and an upper end and a lower end, together with the annular frustoconical wall defining a partial enclosure, with the upper end having a first diameter that is smaller than a second diameter of the lower end, and the upper end surrounding an upper opening to the partial enclosure, and the lower end surrounding a lower opening to the partial enclosure;
   a head connected to the upper end of the wall, said head extending curvilinearly and radially inwardly from the upper end of the wall;
   a rib connected to and extending outwardly from the outer surface near the bottom end of the wall;
   a stand-off plate connected to the outer surface of the wall, said stand-off plate defining a surface bounding at least a portion of a locking recess between the stand-off plate and the rib for securing a barrier film to the plant edging.

2. The plant edging as in claim 1, including a plurality of stand-off plates arrayed around the wall.

3. The plant edging as in claim 2 wherein said rib extends annularly around the lower end of the wall.

4. The plant edging as in claim 3 wherein the locking recess is bound by the bounding surface of said stand-off plate and said annular frustoconical wall.

5. The plant edging as in claim 3 wherein the locking recess is bound only by the bounding surface of said stand-off plate.

6. A method for inhibiting weed growth in proximity to a plant, said method comprising:
(a) providing the plant edging of claim 1;
(b) positioning a barrier film so that the annular frustoconical wall is within an opening in the barrier film, and so that the barrier film is in proximity to a ground surface; and
(c) inserting the barrier film into the locking recess to secure the barrier film to the plant edging, wherein the plant is capable of extending through the upper opening of the partial enclosure.

7. The method as in claim 6, including positioning the plant edging against the ground surface with the lower opening to the partial enclosure superimposed over a planting location for the plant.

8. The method as in claim 7, including planting the plant at the planting location.

9. The method as in claim 8 wherein the annular frustoconical wall surrounds a portion of the plant.

10. The method as in claim 9, including filling the partial enclosure with soil.

11. The method as in claim 10, including surrounding the outer surface of the annular frustoconical wall with landscaping material.

12. The method as in claim 11 wherein the landscaping material is selected from soil, rock, woodchips, gravel, sand, and grass.

13. The method as in claim 6 wherein the barrier film includes a porous fabric.

* * * * *